United States Patent
Oba

(10) Patent No.: US 12,065,157 B2
(45) Date of Patent: Aug. 20, 2024

(54) VEHICLE CONTROL APPARATUS AND VEHICLE CONTROL METHOD

(71) Applicant: SONY SEMICONDUCTOR SOLUTIONS CORPORATION, Kanagawa (JP)

(72) Inventor: Eiji Oba, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 390 days.

(21) Appl. No.: 16/466,704

(22) PCT Filed: Jan. 5, 2018

(86) PCT No.: PCT/JP2018/000095
§ 371 (c)(1),
(2) Date: Jun. 5, 2019

(87) PCT Pub. No.: WO2018/135318
PCT Pub. Date: Jul. 26, 2018

(65) Prior Publication Data
US 2019/0329791 A1 Oct. 31, 2019

(30) Foreign Application Priority Data

Jan. 19, 2017 (JP) .................................. 2017-007477

(51) Int. Cl.
*B60W 50/12* (2012.01)
*B60K 28/06* (2006.01)
(Continued)

(52) U.S. Cl.
CPC ........... *B60W 50/12* (2013.01); *B60K 28/063* (2013.01); *B60N 2/0244* (2013.01); *B60W 50/14* (2013.01);
(Continued)

(58) Field of Classification Search
None
See application file for complete search history.

(56) References Cited

U.S. PATENT DOCUMENTS 9,146,898 B2 * 9/2015 Ihlenburg .............. B60W 30/09
9,650,058 B2 * 5/2017 Schiek ................... B60K 37/06
(Continued)

FOREIGN PATENT DOCUMENTS

CN 201749540 U * 2/2011
CN 105857076 A * 8/2016 ........... B60K 28/063
(Continued)

OTHER PUBLICATIONS

English translation and original document for Endo Tokukazu (JP H06171391 A) (Year: 1994).*
(Continued)

*Primary Examiner* — Aniss Chad
*Assistant Examiner* — Madison R. Inserra
(74) *Attorney, Agent, or Firm* — CHIP LAW GROUP

(57) ABSTRACT

The present technology relates to a vehicle control apparatus and a vehicle control method that allow safer automated driving. The vehicle control apparatus includes a driver monitoring section and a penalty application section. The driver monitoring section detects a driving intervention level indicating an extent to which the driver intervenes in driving of a vehicle. The penalty application section applies a penalty disadvantageous to the driver in the case where the driving intervention level is insufficient. The present technology is applicable, for example, to a vehicle control apparatus that controls automated driving.

18 Claims, 11 Drawing Sheets

(51) Int. Cl.
  *B60N 2/02* (2006.01)
  *B60W 50/14* (2020.01)
  *G05D 1/00* (2024.01)
  *G07C 5/02* (2006.01)
  *B60W 60/00* (2020.01)
  *G08G 1/16* (2006.01)

(52) U.S. Cl.
  CPC ......... *G05D 1/0016* (2013.01); *G05D 1/0212* (2013.01); *B60W 2540/22* (2013.01); *B60W 2720/10* (2013.01); *G07C 5/02* (2013.01)

(56) References Cited

U.S. PATENT DOCUMENTS

| | | | |
|---|---|---|---|
| 9,663,118 B1* | 5/2017 | Palmer | B60K 28/06 |
| 9,823,657 B1* | 11/2017 | Palmer | G07C 5/008 |
| 10,157,423 B1* | 12/2018 | Fields | G05D 1/0088 |
| 10,324,463 B1* | 6/2019 | Konrardy | G01S 19/14 |
| 10,336,341 B2* | 7/2019 | Asakura | G05D 1/0088 |
| 10,379,543 B2* | 8/2019 | Heo | G05D 1/024 |
| 10,691,123 B2* | 6/2020 | Abe | G05D 1/0061 |
| 10,926,760 B2* | 2/2021 | Katsuki | G06K 9/00805 |
| 10,960,879 B2* | 3/2021 | Shimada | B60W 50/082 |
| 10,967,877 B2* | 4/2021 | Asakura | B60W 50/08 |
| 2005/0030184 A1* | 2/2005 | Victor | B60K 35/00 340/576 |
| 2005/0128092 A1* | 6/2005 | Bukman | B60W 40/08 340/576 |
| 2006/0089763 A1* | 4/2006 | Barrett | G05D 1/0061 701/23 |
| 2006/0089765 A1* | 4/2006 | Pack | G06N 3/008 701/23 |
| 2006/0089766 A1* | 4/2006 | Allard | G05D 1/0061 701/23 |
| 2007/0225882 A1* | 9/2007 | Yamaguchi | B60W 30/095 701/36 |
| 2010/0214105 A1* | 8/2010 | Manotas, Jr. | A61B 5/18 348/148 |
| 2011/0109462 A1* | 5/2011 | Deng | G08B 21/06 340/576 |
| 2012/0212353 A1* | 8/2012 | Fung | G01C 21/3697 340/905 |
| 2012/0289214 A1* | 11/2012 | Hynes | H04M 1/72463 455/418 |
| 2014/0156133 A1* | 6/2014 | Cullinane | B60W 50/082 701/23 |
| 2015/0210272 A1* | 7/2015 | Edgren | B60W 50/10 701/23 |
| 2015/0293534 A1* | 10/2015 | Takamatsu | B60W 50/08 701/28 |
| 2016/0121907 A1* | 5/2016 | Otake | B60W 10/18 701/23 |
| 2016/0207537 A1* | 7/2016 | Urano | B60W 50/16 |
| 2016/0304124 A1 | 10/2016 | Fujiyoshi et al. | |
| 2016/0375911 A1* | 12/2016 | Coelingh | B60K 28/10 701/23 |
| 2017/0028163 A1* | 2/2017 | Onuma | A61H 9/0078 |
| 2017/0028995 A1* | 2/2017 | Mori | B60Q 9/008 |
| 2017/0144670 A1* | 5/2017 | Chou | B60W 40/08 |
| 2017/0282790 A1* | 10/2017 | Pan | B60T 7/22 |
| 2017/0297569 A1* | 10/2017 | Nilsson | B60W 60/0053 |
| 2017/0303842 A1* | 10/2017 | Yoshida | B60W 50/0097 |
| 2017/0308090 A1* | 10/2017 | Asakura | B60W 30/182 |
| 2017/0313319 A1* | 11/2017 | Kishi | G06V 20/597 |
| 2017/0313321 A1* | 11/2017 | Asakura | G01C 21/3469 |
| 2017/0329327 A1* | 11/2017 | Trigui | G05D 1/0257 |
| 2017/0334441 A1* | 11/2017 | Sen | B60W 50/082 |
| 2017/0364070 A1* | 12/2017 | Oba | B60K 28/066 |
| 2017/0370732 A1* | 12/2017 | Bender | G08G 1/096838 |
| 2018/0056991 A1* | 3/2018 | Sogen | G05D 1/0214 |
| 2018/0056992 A1* | 3/2018 | Sogen | G06F 16/29 |
| 2018/0065549 A1* | 3/2018 | Watanabe | B60Q 5/005 |
| 2018/0093675 A1* | 4/2018 | Holub | B60W 30/14 |
| 2018/0120839 A1* | 5/2018 | Hasberg | B60W 50/08 |
| 2018/0178808 A1* | 6/2018 | Zhao | G08B 21/06 |
| 2018/0201188 A1* | 7/2018 | Sakuma | B60W 40/107 |
| 2018/0329414 A1* | 11/2018 | Igarashi | B60W 40/08 |
| 2018/0345980 A1* | 12/2018 | Morita | B60W 40/08 |
| 2018/0373244 A1* | 12/2018 | Augst | B60W 30/10 |
| 2019/0056732 A1* | 2/2019 | Aoi | B60W 50/14 |
| 2019/0106120 A1* | 4/2019 | Hatano | B60W 10/04 |
| 2019/0129417 A1* | 5/2019 | Noto | B60W 30/16 |
| 2019/0155279 A1* | 5/2019 | Tayama | G08G 1/0962 |
| 2019/0168772 A1* | 6/2019 | Emura | G06K 9/00832 |
| 2019/0227547 A1* | 7/2019 | Sugahara | B60K 28/06 |
| 2019/0250628 A1* | 8/2019 | Rothhamel | G05D 1/0221 |
| 2019/0304309 A1* | 10/2019 | Sakamoto | B60W 50/14 |
| 2019/0339695 A1* | 11/2019 | Feron | G05D 1/0061 |

FOREIGN PATENT DOCUMENTS

| | | | | |
|---|---|---|---|---|
| JP | H06171391 A | 6/1994 | | |
| JP | 2002-163799 A | 6/2002 | | |
| JP | 2012-164040 A | 8/2012 | | |
| JP | 2014-229123 A | 12/2014 | | |
| JP | 2016-038793 A | 3/2016 | | |
| JP | 2016-064773 A | 4/2016 | | |
| JP | 2016-115356 A | 6/2016 | | |
| JP | 2016115023 A | 6/2016 | | |
| JP | 2016-151815 A | 8/2016 | | |
| JP | 2016-203718 A | 12/2016 | | |
| WO | WO-2014073079 A | 5/2014 | | |
| WO | WO-2014073079 A1 * | 5/2014 | | B60K 28/06 |
| WO | WO-2016035199 A1 | 3/2016 | | |
| WO | WO-2016/152873 A1 | 9/2016 | | |
| WO | WO-2016152874 A1 | 9/2016 | | |
| WO | 2016/199379 A1 | 12/2016 | | |
| WO | 2016/207938 A1 | 12/2016 | | |
| WO | 2016199379 A1 | 12/2016 | | |
| WO | 2016207938 A1 | 12/2016 | | |
| WO | WO-2017097381 A1 * | 6/2017 | | |

OTHER PUBLICATIONS

International Search Report and Written Opinion of PCT Application No. PCT/JP2018/000095, issued on Feb. 13, 2018, 11 pages of ISRWO.

Office Action issued for JP Application 2018-563270 on Jun. 29, 2021, pp. 6.

* cited by examiner

F I G. 4

| LEVEL | NAME | PRIMARY PERFORMER OF DRIVING TASK | PERFORMER OF MONITORING AND RESPONSES RELATED TO SAFE DRIVING |
|---|---|---|---|
| 0 | NO DRIVING AUTOMATION | DRIVER PERFORMS ALL OR SOME OF DRIVING TASKS | DRIVER |
| 1 | DRIVER ASSISTANCE | | DRIVER |
| 2 | PARTIAL DRIVING AUTOMATION | | DRIVER |
| 3 | CONDITIONAL DRIVING AUTOMATION | SYSTEM PERFORMS ALL DRIVING TASKS | SYSTEM (DRIVER DURING FALLBACK) |
| 4 | HIGH DRIVING AUTOMATION | | SYSTEM |
| 5 | FULL DRIVING AUTOMATION | | SYSTEM |

FIG. 10

| No. | DATE | TIME | MONITORING STATE | EVENT | PENALTY | REASON FOR APPLICATION |
|---|---|---|---|---|---|---|
| 1 | 2020/1/1 | 8:10:40 | N/A | STARTED RECORDING | NOT APPLICABLE | |
| 2 | 2020/1/1 | 8:15:00 | N/A | SENT REQUEST FOR LDM OF ALL ROUTES TO DESTINATION | NOT APPLICABLE | |
| 3 | 2020/1/1 | 8:18:00 | N/A | RECEIVED LDM OF ALL ROUTES TO DESTINATION | NOT APPLICABLE | |
| 4 | 2020/1/1 | 8:45:00 | N/A | UPDATED MOST RECENT LDM FORWARD ALONG TRAVELING ROUTE | NOT APPLICABLE | |
| 5 | 2020/1/1 | 8:55:00 | N/A | ACQUIRED WEATHER FORECAST ON TRAVELING ROUTE | NOT APPLICABLE | |
| 6 | 2020/1/1 | 9:15:00 | Start | REQUESTED MANUAL DRIVING DUE TO DIFFICULT-TO-RECOGNIZE ROAD SIGNS IN ZONE | NOT APPLICABLE | |
| 7 | 2020/1/1 | 9:15:05 | Monitoring | DETECTED REDUCED DRIVING INTERVENTION LEVEL | NOT APPLICABLE | |
| 8 | 2020/1/1 | 9:15:30 | Monitoring | ALERTED DRIVER | NOT APPLICABLE | |
| 9 | 2020/1/1 | 9:18:00 | Monitoring | DETECTED DRIVER'S CONDITION | NOT APPLICABLE | |
| 10 | 2020/1/1 | 9:19:00 | Monitoring | CONTINUOUSLY DETECTED REDUCED DRIVING INTERVENTION LEVEL | NOT APPLICABLE | |
| 11 | 2020/1/1 | 9:23:00 | Monitoring | APPLIED PENALTY | RANK 10 | SERIOUS VIOLATION DUE TO FAILURE TO RESUME |
| 12 | 2020/1/1 | 9:31:00 | Monitoring | CAN RESUME AUTOMATION LEVEL 3 | NOT APPLICABLE | |
| 13 | 2020/1/1 | 9:32:00 | End | STARTED AUTOMATION LEVEL 3 | NOT APPLICABLE | |
| 14 | 2020/1/1 | 10:15:00 | Start | REQUESTED MANUAL DRIVING DUE TO APPROACHING COMPLICATED ROAD MERGING ZONE | NOT APPLICABLE | |
| 15 | 2020/1/1 | 10:15:15 | Monitoring | DETECTED DRIVER'S CONDITION | NOT APPLICABLE | |
| 16 | 2020/1/1 | 10:15:30 | Monitoring | PERFORMED ACTIVE MONITORING | NOT APPLICABLE | |
| 17 | 2020/1/1 | 10:15:35 | Monitoring | RECORDED DRIVER'S RESPONSE TO ACTIVE MONITORING | NOT APPLICABLE | |
| 18 | 2020/1/1 | 10:15:48 | Monitoring | INAPPROPRIATE STEERING INCIDENT OCCURRED | NOT APPLICABLE | |
| 19 | 2020/1/1 | 10:16:20 | Monitoring | RECEIVED REQUEST TO RESUME AUTOMATED MODE | NOT APPLICABLE | |
| 20 | 2020/1/1 | 10:19:00 | End | STARTED AUTOMATION LEVEL 3 | NOT APPLICABLE | |
| 21 | 2020/1/1 | 10:30:00 | N/A | UPDATED MOST RECENT LDM FORWARD ALONG TRAVELING ROUTE | NOT APPLICABLE | |
| 22 | 2020/1/1 | 11:01:00 | Start | RECEIVED RISK INFORMATION ON TRAVELING ROUTE | NOT APPLICABLE | |
| 23 | 2020/1/1 | 11:01:05 | Monitoring | NOTIFIED RISK INFORMATION TO DRIVER | NOT APPLICABLE | |
| 24 | 2020/1/1 | 11:01:10 | Monitoring | DETECTED REDUCED DRIVING INTERVENTION LEVEL | NOT APPLICABLE | |
| 25 | 2020/1/1 | 11:01:15 | Monitoring | APPLIED PENALTY | RANK 2 | REDUCED DRIVING INTERVENTION LEVEL REQUIRED RECOVERY |
| 26 | 2020/1/1 | 11:01:20 | Monitoring | DETECTED NORMAL DRIVING INTERVENTION LEVEL | NOT APPLICABLE | |
| 27 | 2020/1/1 | 11:02:25 | Monitoring | DETECTED DRIVER'S CONDITION DURING APPLICATION OF DECELERATION PENALTY | NOT APPLICABLE | |
| 28 | 2020/1/1 | 11:02:35 | Monitoring | DETECTED DRIVER'S CONDITION DURING APPLICATION OF DECELERATION PENALTY | NOT APPLICABLE | |
| 29 | 2020/1/1 | 12:02:40 | Monitoring | UPDATED MOST RECENT LDM FORWARD ALONG TRAVELING ROUTE | NOT APPLICABLE | |

VEHICLE CONTROL APPARATUS AND VEHICLE CONTROL METHOD

CROSS REFERENCE TO RELATED APPLICATIONS

This application is a U.S. National Phase of International Patent Application No. PCT/JP2018/000095 filed on Jan. 5, 2018, which claims priority benefit of Japanese Patent Application No. JP 2017-007477 filed in the Japan Patent Office on Jan. 19, 2017. Each of the above-referenced applications is hereby incorporated herein by reference in its entirety.

TECHNICAL FIELD

The present technology relates to a vehicle control apparatus and a vehicle control method, and, relates, in particular, to a vehicle control apparatus and a vehicle control method that allow safer automated driving.

BACKGROUND ART

Proposals have been made so far to determine whether or not a driver's poor posture is habitual for the driver and notify the driver of the poor posture differently in the case of the poor posture and in the case other than the poor posture (refer, for example, to PTL 1).

Also, proposals have been made so far to prohibit traveling in automated driving mode before the traveling in automated driving mode is initiated in the case where it is determined that a driver is not capable of resuming manual driving after switching from automated driving (refer, for example, to PTL 2).

CITATION LIST

Patent Literature

[PTL 1]
Japanese Patent Laid-open No. 2016-38793
[PTL 2]
Japanese Patent Laid-open No. 2016-115356

SUMMARY

Technical Problem

Incidentally, there is a concern that the proliferation of automated driving entails a risk of drivers' dependence on automated driving. If a driver relies on automated driving, and in the case where the vehicle becomes unable to travel in automated driving mode, for example, the driver cannot speedily intervene in driving, thus resulting in a higher risk of accident.

However, PTL 1 and PTL 2 have not considered the prevention of drivers' dependence on automated driving.

The present technology has been devised in light of the foregoing circumstances, and it is an object of the present technology to ensure improved safety in automated driving.

Solution to Problem

A vehicle control apparatus of an aspect of the present technology includes a driver monitoring section and a penalty application section. The driver monitoring section detects a driving intervention level indicating an extent to which a driver intervenes in driving of a vehicle. The penalty application section applies a penalty disadvantageous to the driver in a case where the driving intervention level is insufficient.

The penalty application section can be caused to apply the penalty when the driving intervention level is insufficient in a case where an automated driving level makes a transition from a no-driving intervention level to a driving intervention level.

A driving support section can be further provided that restricts driving maneuvers until the driver properly responds to a given instruction in a case where the insufficient driving intervention level is resolved after the penalty has been applied.

The penalty application section can be caused to apply the penalty in a case where the driving intervention level remains insufficient even after a process has been performed to alert the driver before application of the penalty.

The penalty application section can be caused to apply the penalty on the basis of at least one of the number of occurrences of the insufficient driving intervention level or a frequency of occurrences thereof.

The penalty application section can be caused to change the penalty to be applied in a case where the application of the penalty is repeated.

The penalty can cause discomfort or reduce convenience for the driver.

The penalty can include bringing a backrest of a driver's seat closer to a vertical direction relative to a seating surface.

The penalty can include restricting an upper limit speed of the vehicle.

The penalty can include restricting automated driving functions of the vehicle.

The penalty can include changing a traveling route so that the vehicle will pass a route that requires the driver's intervention in driving.

The penalty application section can be caused to apply the penalty after arrival of the vehicle at a destination or after forceful halting of the vehicle.

The penalty application section can be caused to prohibit the vehicle from starting for a given time period.

The penalty application section can be caused to record, in a log, information regarding the penalty to be applied after the arrival of the vehicle at the destination or after the forceful halting of the vehicle.

The driver monitoring section can be caused to determine whether or not the driving intervention level is insufficient on the basis of a condition that varies depending on the automated driving level.

The penalty application section can be caused to stop the application of the penalty in the case where the insufficient driving intervention level is resolved.

A driver's condition detection section can be further provided that detects at least one of driver's responsiveness or awakening level, and the driver monitoring section can be caused to detect the driving intervention level by using at least one of the driver's responsiveness or awakening level.

The driver's condition detection section can be caused to detect at least one of the driver's responsiveness or awakening level on the basis of the driver's response to a stimulus or an instruction given to the driver.

The driver's condition detection section can be caused to give an instruction via an information processing apparatus used by the driver.

A vehicle control method of an aspect of the present technology includes a driver monitoring step and a penalty application step. The driver monitoring step detects a driving intervention level indicating a level at which a driver intervenes in driving of a vehicle. The penalty application step applies a penalty disadvantageous to the driver in a case where the driving intervention level is insufficient.

In an aspect of the present technology, a driving intervention level is detected that indicates an extent to which the driver intervenes in driving of a vehicle. A penalty disadvantageous to the driver is applied in the case where the driving intervention level is insufficient.

Advantageous Effects of Invention

According to an aspect of the present technology, a driver's driving intervention level is corrected, thus ensuring improved safety in automated driving.

It should be noted that the effects described herein are not necessarily limited and may be any of the effects described in this disclosure.

BRIEF DESCRIPTION OF DRAWINGS

FIG. 4 is a diagram for describing an automation level.

FIG. 10 is a diagram illustrating a specific example of a log.

DESCRIPTION OF EMBODIMENT

A detailed description will be given below of a mode for carrying out the invention (hereinafter referred to as an embodiment) with reference to the drawings. It should be noted that the description will be given in the following order:

1. Embodiment
2. Modification example
3. Others

1. Embodiment

Configuration Example of the Automated Driving System

Figure 1:
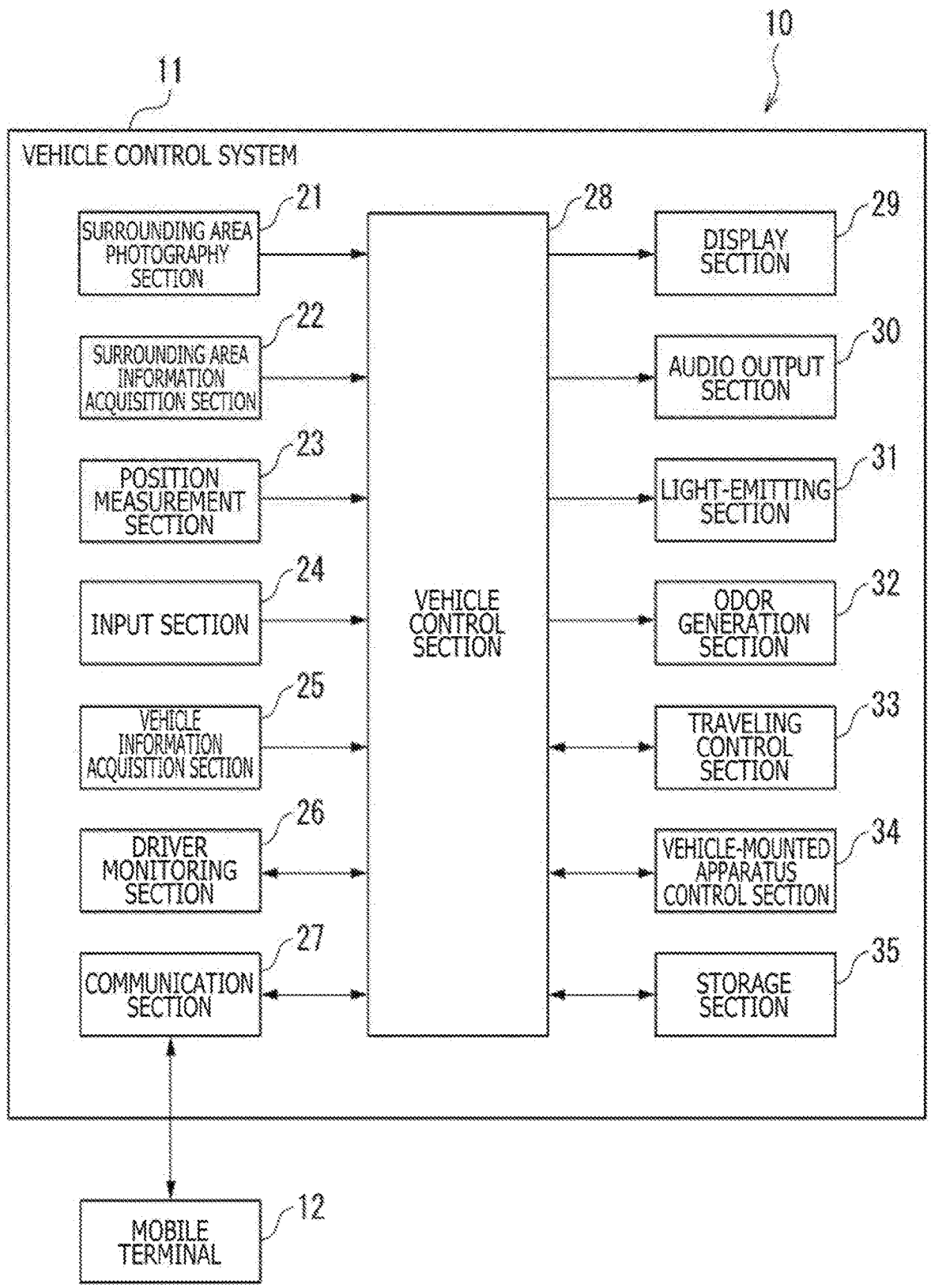
FIG. 1 is a block diagram illustrating a configuration example of an automated driving system to which the present technology is applied.

FIG. 1 illustrates a configuration example of an automated driving system 10 to which the present technology is applied.

The automated driving system 10 includes a vehicle control system 11 and a mobile terminal 12.

The vehicle control system 11 includes a surrounding area photography section 21, a surrounding area information acquisition section 22, a position measurement section 23, an input section 24, a vehicle information acquisition section 25, a driver monitoring section 26, a communication section 27, a vehicle control section 28, a display section 29, an audio output section 30, a light-emitting section 31, an odor generation section 32, a traveling control section 33, a vehicle-mounted apparatus control section 34, and a storage section 35.

The surrounding area photography section 21 includes, for example, various types of photographing apparatuses such as a mono camera, a stereo camera, a Tof (Time of Flight) camera, a polarization camera, a time-gated camera, a multi-spectral camera, and an infrared or other type of non-visible light camera and photographs surrounding areas of a vehicle including a direction of travel. The surrounding area photography section 21 supplies the images acquired by the photography (hereinafter referred to as surrounding area images) to the vehicle control section 28.

The surrounding area information acquisition section 22 includes various kinds of sensors such as a sonar, a radar, a lidar, and a temperature sensor and acquires information regarding surrounding areas of the vehicle. For example, the surrounding area information acquisition section 22 acquires information regarding an environment of the surrounding areas of the vehicle such as temperature, humidity, weather, and road surface condition and information regarding objects in the surrounding areas of the vehicle such as types and positions of objects in the surrounding areas of the vehicle. The surrounding area information acquisition section 22 supplies the acquired surrounding area information to the vehicle control section 28.

The position measurement section 23 measures the current position of the vehicle by using a satellite navigation system such as a GNSS (Global Navigation Satellite System) that measures the current position, for example, by using an artificial satellite. The position measurement section 23 supplies the measurement result to the vehicle control section 28.

The input section 24 includes input devices such as a microphone, buttons, switches, a touch panel, and gesture recognition equipment and accepts inputs such as instructions and data from passengers of the vehicle including the driver. The input section 24 supplies the input instructions, data, and so on to the vehicle control section 28.

The vehicle information acquisition section 25 acquires vehicle information including various types of information regarding the vehicle. For example, the vehicle information acquisition section 25 acquires information regarding vehicle motion such as vehicle speed, acceleration, angular speed, and direction of travel. Also, the vehicle information acquisition section 25 acquires information regarding driving maneuvers such as timings and amounts of maneuvering of an accelerator pedal, a brake pedal, a steering wheel, a parking brake, a shift lever, a turn signal lever, a power (ignition) switch, a lamp switch, and a wiper switch. Further, the vehicle information acquisition section 25 acquires information regarding the vehicle conditions such as conditions of different parts of the vehicle, presence or absence of malfunctions, and so on. The vehicle information acquisition section 25 supplies the acquired vehicle information to the vehicle control section 28.

The driver monitoring section 26 monitors the driver as described later with reference to FIG. 2 and supplies the monitoring result to the vehicle control section 28.

The communication section 27 includes communication apparatuses that support various communication schemes.

For example, the communication section 27 includes a communication apparatus that engages in wireless communication through DSRC (Dedicated Short Range Communications), communicates with ITS (Intelligent Transport Systems) spots installed on roadsides, and acquires an LDM (Local Dynamic Map). The LDM includes, for example, static information including road surface information, lane information, and 3D structure information, quasi-static information including road traffic restriction information, road work information, and wide area meteorological information, quasi-dynamic information including accident information, traffic jam information, and narrow area meteorological information, and dynamic information including surrounding area vehicle and pedestrian information and traffic light information.

For example, the communication section 27 includes a communication apparatus that engages in communication in accordance with a communication standard (e.g., 3G/4G/LTE (Long Term Evolution)) supported by mobile phones for communication and acquires various types of information such as map data from servers via a network such as the Internet.

For example, the communication section 27 includes a beacon apparatus, communicates with roadside units installed on roadsides to support safe driving, and acquires various types of traffic information.

For example, the communication section 27 includes a Bluetooth (registered trademark) or other short-range wireless communication apparatus, communicates with the mobile terminal 12, and exchanges various types of information.

The communication section 27 supplies the information acquired to the vehicle control section 28. Also, the communication section 27 acquires information to be sent to other communication apparatuses and so on from the vehicle control section 28.

The vehicle control section 28 includes an ECU (Electronic Control Unit) and so on and controls each section of the vehicle control system 11 as will be described with reference to FIG. 2.

The display section 29 includes, for example, various types of display apparatuses and displays various images and pieces of information under control of the vehicle control section 28. For example, the display section 29 includes a head-up display or a transmissive display provided on part of a windshield and displays an image or information in a field of view of the driver. Also, for example, the display section 29 includes displays of an instrument panel, a car navigation system, and so on.

The audio output section 30 includes, for example, a speaker, an alarm, a buzzer, and so on, and outputs audio information, a warning sound, and so on under control of the vehicle control section 28.

The light-emitting section 31 includes, for example, a light-emitting apparatus such as an LED (Light Emitting Diode) or a lamp and lights up or flashes under control of the vehicle control section 28 to notify the driver of various types of information, alert the driver, or for other purposes.

The odor generation section 32 includes, for example, a bad odor generator and a deodorizer for deodorizing odors and generates an odor or neutralizes the generated odor under control of the vehicle control section 28. It should be noted that the deodorizer is not essential, and the bad odor may be deodorized through self-neutralization and so on after diffusion in the air such that the generation of the bad odor is transient.

The traveling control section 33 controls, of various types of apparatuses mounted to the vehicle, those related to traveling of the vehicle under control of the vehicle control section 28. For example, the traveling control section 33 includes an engine control apparatus for controlling engine startup, a motor control apparatus for controlling motor startup, a brake control apparatus for controlling brake actions, and a steering control apparatus for controlling steering actions, and so on.

The vehicle-mounted apparatus control section 34 controls, of various types of apparatuses mounted to the vehicle, apparatuses other than those related to traveling of the vehicle. For example, the vehicle-mounted apparatus control section 34 controls an actuator for controlling an inclination of a seat, an actuator for causing the seat to vibrate, an actuator for causing the steering wheel to vibrate, and so on.

The storage section 35 stores programs and data required for processes performed by the vehicle control system 11. For example, the storage section 35 stores a log regarding traveling of the vehicle, face images and recognized/identified/extracted information for authentication of the driver, learning results regarding various characteristics of the driver, and so on. It should be noted that all information need not necessarily be stored in the storage section 35. For example, information may be sent to a remote server and so on via the communication section 27 for storage.

Configuration Example of the Driver Monitoring Section 26 and the Vehicle Control Section 28

Figure 2:
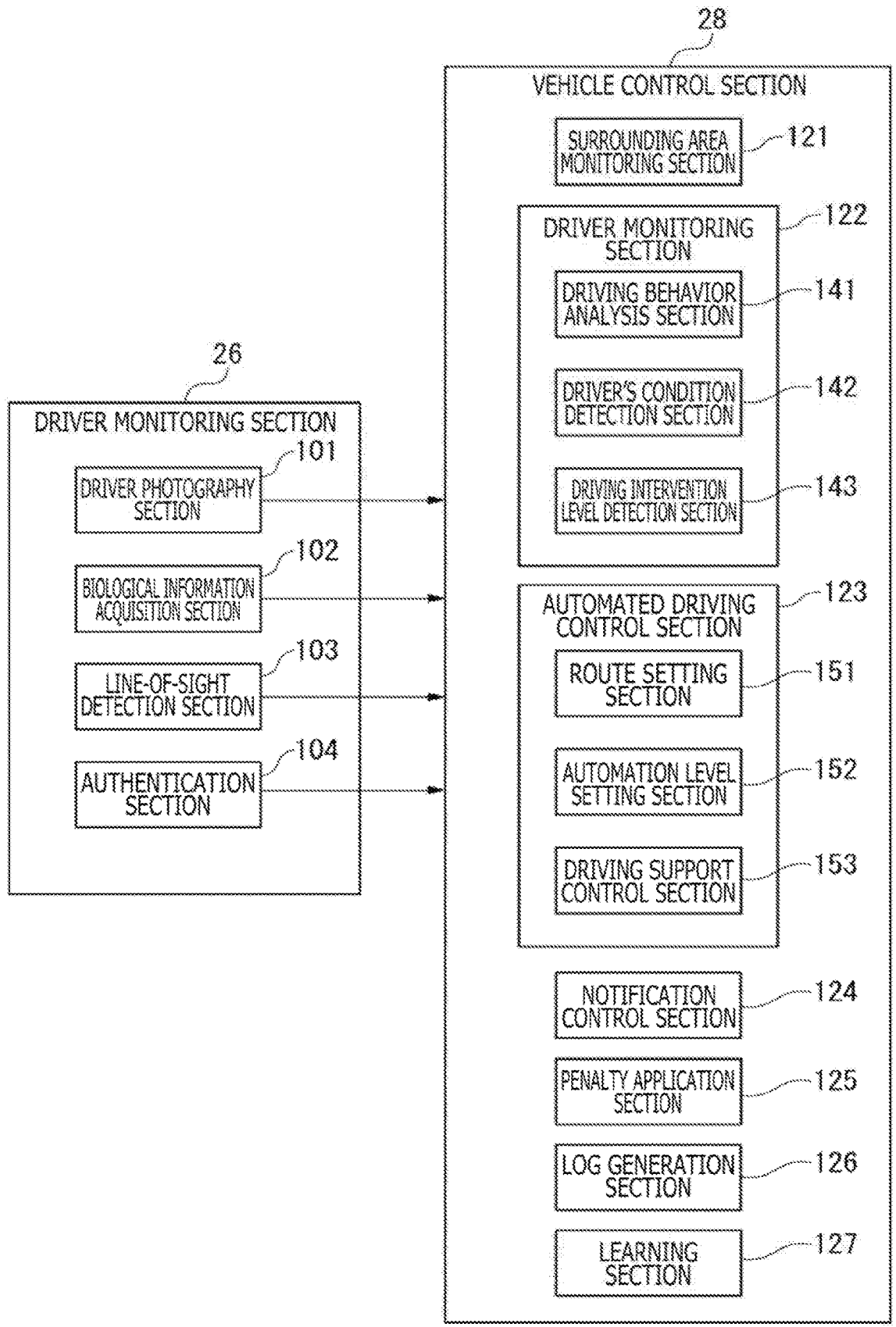
FIG. 2 is a block diagram illustrating a configuration example of a driver monitoring section and a vehicle control section.

FIG. 2 illustrates a configuration example of the driver monitoring section 26 and the vehicle control section 28 of the vehicle control system 11.

The driver monitoring section 26 includes a driver photography section 101, a biological information acquisition section 102, a line-of-sight detection section 103, and an authentication section 104.

The driver photography section 101 includes a photographing apparatus and photographs the driver. A photography range of the driver photography section 101 includes at least an upper part of the driver from the neck during driving and may include a larger region. The driver photography section 101 supplies an image acquired by the photography (hereinafter referred to as a driver's image) to the vehicle control section 28. It should be noted that when the driver is photographed, the driver may be illuminated, for example, by using a dedicated light source such as a light source emitting structured light or a light source emitting infrared light of a specific wavelength to acquire more accurate and inherent information.

The biological information acquisition section 102 includes sensors and so on for detecting various types of biological information of the driver. Biological information to be acquired by the biological information acquisition section 102 includes, for example, pulse rate, an electrocardiogram, body temperature, body odor, skin temperature, respiratory conditions, and alcohol content. The biological information acquisition section 102 supplies the acquired driver's biological information to the vehicle control section 28.

The line-of-sight detection section 103 detects an orientation of the driver's face, an orientation of the line of sight, blinking, and eyeball movement (e.g., vision fixation, saccade). The line-of-sight detection section 103 further evaluates the driver's alertness to the outside world and analyzes the awakening level from dynamic analysis of the line of sight and supplies the detection and analysis results to the vehicle control section 28.

The authentication section 104 authenticates the driver, for example, on the basis of not only the driver's image and a line-of-sight analysis image but also iris authentication and fingerprints, and further a personal inherent pulse waveform included in a pulse waveform. The authentication section 14 supplies the authentication result to the vehicle control section 28.

The vehicle control section 28 includes a surrounding area monitoring section 121, a driver monitoring section 122, an automated driving control section 123, a notification control section 124, a penalty application section 125, a log generation section 126, and a learning section 127.

The surrounding area monitoring section 121 monitors surrounding areas of the vehicle on the basis of a surrounding area image from the surrounding area photography section 21, surrounding area information from the surrounding area information acquisition section 22, and various types of information from the communication section 27.

The driver monitoring section 122 monitors the driver on the basis of vehicle information from the vehicle information acquisition section 25, the driver's image from the driver photography section 101, biological information from the biological information acquisition section 102, the detection result of the line-of-sight detection section 103, the authentication result of the authentication section 104, the learning result of the learning section 127, and so on. The driver monitoring section 122 includes a driving behavior analysis section 141, a driver's condition detection section 142, and a driving intervention level detection section 143.

The driving behavior analysis section 141 analyzes driver's driving behaviors (e.g., authenticated driver's inherent features and characteristics such as maneuvers and conducts toward driving) on the basis of the driver's image, vehicle information, the learning result of the learning section 127, and so on.

The driver's condition detection section 142 detects the authenticated driver's inherent condition on the basis of the driver's image, biological information of the driver, the detection result of the line-of-sight detection section 103, the authentication result of the authentication section 104, the learning result of the learning section 127, and so on.

The driving intervention level detection section 143 detects a driving intervention level indicating an extent to which the driver intervenes in driving of the vehicle on the basis of the analysis result of the driver's driving behaviors, the detection result of the driver's condition, and an automation level set by an automation level setting section 152.

The automated driving control section 123 controls automated driving. The automated driving control section 123 includes a route setting section 151, the automation level setting section 152, and a driving support control section 153.

The route setting section 151 corrects a vehicle's current position measured by the position measurement section 23 on the basis of the vehicle's acceleration and angular speed included in the vehicle information of the vehicle information acquisition section 25. Also, the route setting section 151 sets a traveling route to a destination input via the input section 24 on the basis of surrounding area information from the surrounding area information acquisition section 22, an LDM, map data, and map update information acquired via the communication section 27, and map data stored in the storage section 35.

The automation level setting section 152 sets an automation level distribution on the traveling route on the basis of not only surrounding area information from the surrounding area information acquisition section 22 but also the LDM and traffic information acquired via the communication section 27. Also, the automation level setting section 152 sets an automation level on the basis of the automation level distribution, a user setting input via the input section 24, an instruction from the penalty application section 125, and so on.

Here, the automation level refers to an automated driving level, in other words, the extent to which automated driving is conducted and will be described in detail later with reference to FIG. 4.

The driving support control section 153 realizes automated driving by controlling the traveling control section 33 in accordance with the set automation level and supporting the driver's driving. For example, the driving support control section 153 provides driving support such as an ACC (Adaptive Cruise Control), an LKAS (Lane Keep Assist System), a TJA (Traffic Jam Assist), an AEBS (Advanced Emergency Braking System), and so on. Further, the driving support control section 153 may, for example, perform further advanced and complicated control (e.g., changing lanes and overtaking) through the above driving support in a traveling zone equal to or higher than automation level 3 (described later) or provide driving support through autonomous traveling associated with advanced situation assessment involving pedestrians and bicycles in urban and other areas.

The notification control section 124 notifies various types of information to the driver, alerts the driver, or performs other tasks by controlling the display section 29, the audio output section 30, and the light-emitting section 31. Also, the notification control section 124 may notify various types of information to the driver, alert the driver, or perform other tasks by using, for example, the actuators controlled by the vehicle-mounted apparatus control section 34.

The penalty application section 125 applies a penalty to the driver as necessary by controlling the display section 29, the audio output section 30, the light-emitting section 31, the odor generation section 32, the traveling control section 33, and the vehicle-mounted apparatus control section 34 on the basis of the driving intervention level detection result. Also, the penalty application section 125 causes the log generation section 126 to record, in a log, information for applying a penalty by controlling the log generation section 126.

Here, the penalty refers to a disadvantage given to the driver in order to correct the driver's driving intervention level to such an extent that driving is not hindered. One possible way of giving a disadvantage to the driver would be, for example, to cause discomfort to the driver or reduce convenience for the driver.

The log generation section 126 generates and updates a log for recording various events that take place in the vehicle. The log generation section 126 causes the storage section 35 to store the generated or updated log.

Installation Example of Part of the Vehicle Control System 11

Figure 3:
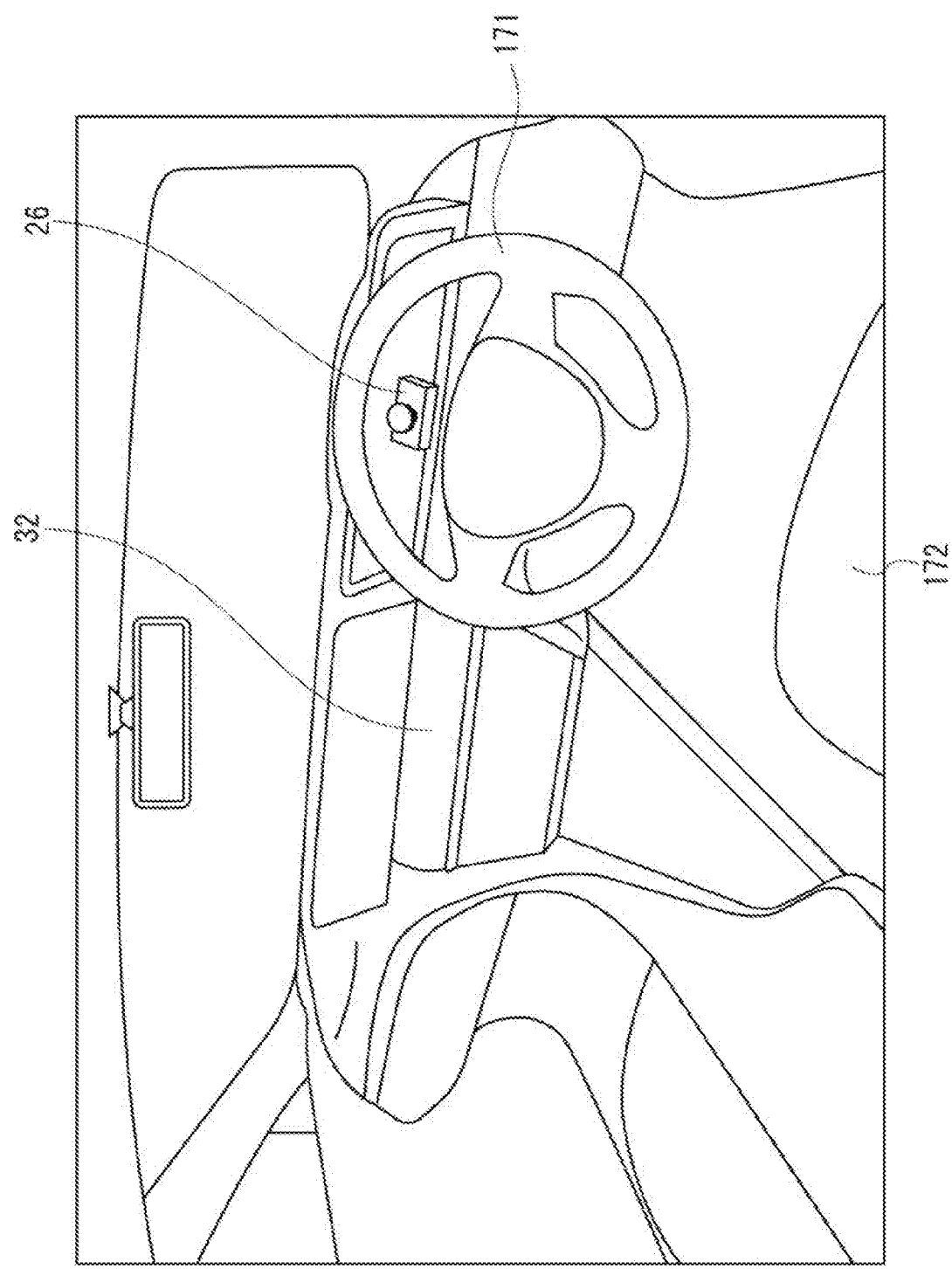
FIG. 3 is a diagram illustrating an installation example of part of a vehicle control system.

FIG. 3 illustrates an installation example of part of the vehicle control system 11.

The driver monitoring section 26 is provided, for example, close to a dashboard in front of a steering wheel 171.

The odor generation section 32 is provided, for example, inside an air-conditioner installed in the dashboard.

An actuator is provided inside the steering wheel 171 to cause the steering wheel 171 to vibrate under control of the vehicle-mounted apparatus control section 34.

An actuator is provided inside a driver's seat 172 to cause the seat 172 to vibrate under control of the vehicle-mounted apparatus control section 34.

Example of Automation Level

FIG. 4 illustrates an example of automation level. Here, examples of automation levels defined by SAE (Society of Automotive Engineers) are depicted.

Automation levels are classified into six stages from level 0 to level 5.

Automation level 0 is referred to as "no driving automation." In automation level 0, the driver performs all driving tasks.

Automation level 1 is referred to as "driver assistance." In automation level 1, a system engaging in automated driving (hereinafter simply referred to as the system) performs subtasks of the driving tasks related to longitudinal or lateral vehicle control.

Automation level 2 is referred to as "partial driving automation." In automation level 2, the system performs the subtasks of the driving tasks related to both longitudinal and lateral vehicle control.

Automation level 3 is referred to as "conditional driving automation." In automation level 3, the system performs all driving tasks within a limited area. Therefore, the driver can perform operations and activities other than driving during traveling of the vehicle such as operating a mobile terminal 12, telephone conferencing, video viewing, playing games, thinking, conversation with other passengers, and so on. It should be noted that the driver is expected to respond properly to a system request or other event, for example, by performing a driving maneuver during a preliminary response (fallback) due to a system failure, aggravation of a traveling environment, or other cause.

Automation level 4 is referred to as "high driving automation." In automation level 4, the system performs all the driving tasks within a limited area. Also, the driver is not expected to perform driving maneuvers and so on during a preliminary response (fallback). Therefore, the driver can take a nap during traveling of the vehicle.

Automation level 5 is referred to as "full driving automation." In automation level 5, the system performs all the driving tasks in all areas. Also, the driver is not expected to perform driving maneuvers and so on during a preliminary response (fallback). Further, in automation level 5, it is assumed that the driver is constantly absent in the vehicle during traveling. Therefore, driving by the driver cannot be expected in all stages. Therefore, fallback is not allowed, and, for example, the system is required to be able to cope with all anomalous conditions, or a route is needed that ensures that no unexpected events arise.

In automation levels 0 to 2, therefore, the driver performs all or some of the driving tasks, and it is the driver who primarily handles monitoring and responses related to safe driving. In these three automation levels, the driver is constantly required to have capability to resume driving as necessary. Therefore, the driver is not allowed to engage in secondary tasks other than driving that may lead to reduced attention or impair attention toward the front during traveling.

In automation levels 3 to 5, on the other hand, the system performs all the driving tasks, and it is the system that primarily handles monitoring and responses related to safe driving. It should be noted, however, that a case may arise in automation level 3 in which the driver is required to perform driving maneuvers. Also, there is a case in which a zone may exist in part of the traveling route where automation levels 3 and 4 are not applicable. In such a zone, the automation level is set to level 2 or lower, and the driver is required to intervene in driving.

It should be noted that driving in which the driver is required to directly influence the driving of the vehicle in one way or another will be hereinafter referred to as manual driving. Therefore, manual driving is performed in automation levels 0 to 2.

On the other hand, driving that does not require any driver intervention will be hereinafter referred to as autonomous/automated driving. In automation levels 3 to 5, therefore, autonomous/automated driving is basically performed. It should be noted, however, that a case may arise in automation level 3 in which manual driving is necessary in response to a system request. That is, disengagement of the driver from driving maneuvers is required to be limited in automation level 3.

It should be noted that a route with a mixture of zones where autonomous/automated driving is possible and zones where manual driving is required can be extended by allowing the driver to resume manual driving safely and smoothly in necessary zones. Also, autonomous/automated driving can be performed in main zones of the traveling route by preventing complete disengagement of the driver from intervention in driving maneuvers and allowing the driver to resume manual driving safely and smoothly.

<Automated Driving Control Process>

A description will be given next of an automated driving control process performed by the vehicle control system 11 with reference to the flowcharts depicted in FIGS. 5 and 6. It should be noted that this process is initiated, for example, when the vehicle's power (ignition) switch is switched ON.

In step S1, the driver monitoring section 26 authenticates the driver. Specifically, the driver photography section 101 of the driver monitoring section 26 photographs the driver. The authentication section 104 recognizes the driver's face in the driver's image acquired by the photography. Then, for example, the authentication section 104 identifies the driver by searching, from among one or more users stored in the storage section 35, for a face image that matches the driver's face. In the case where the driver can be identified, the authentication section 104 determines that the authentication succeeded. In the case where the driver cannot be identified, the authentication section 104 determines that the authentication failed. The authentication section 104 supplies the driver authentication result to the vehicle control section 28.

It should be noted that in the case where the driver authentication failed, the traveling of the vehicle may be prohibited. In this case, the traveling of the vehicle may be permitted if the driver performs a given maneuver in an environment where security is guaranteed and registers as a new user.

It should be noted, however, that the main purpose of the driver authentication is to establish a correlation between characteristics of the driving maneuvers of the authenticated driver and the driver's conditions and control the vehicle or apply a penalty in keeping with the correlation. Therefore, it is not essential to use the authentication result for controlling the permission or prohibition of the traveling of the vehicle. This allows for traveling in an unauthenticated manner, for example, under an emergency situation. It should be noted that the traveling in an unauthenticated manner may be notified to the surroundings, for example, by means of an indicator lamp or through vehicle-to-vehicle communication, or by other means.

In step S2, the log generation section 126 starts recording a log. It should be noted that a log will be described in detail later with reference to FIG. 10.

In step S3, the vehicle control section 28 acquires a destination. Specifically, a passenger of the vehicle (not necessarily limited to the driver) enters the destination via the input section 24. The input section 24 supplies information indicating the acquired destination to the vehicle control section 28.

In step S4, the vehicle control system 11 starts acquiring surrounding area information.

For example, the surrounding area photography section 21 starts photographing a view in the traveling direction of the vehicle and a surrounding area and supplying the surrounding area image acquired by the photography to the vehicle control section 28.

The surrounding area information acquisition section 22 starts acquiring surrounding area information regarding an environment and objects in the surrounding area of the vehicle and supplying the surrounding area information to the vehicle control section 28.

The vehicle information acquisition section 25 starts acquiring vehicle information and supplying the vehicle information to the vehicle control section 28.

The position measurement section 23 starts measuring the current position of the vehicle and supplying the measurement result to the vehicle control section 28.

The communication section 27 starts receiving LDMs (Local Dynamic Maps) from ITS spots (not depicted) and supplying the LDMs to the vehicle control section 28. Also, the communication section 27 starts receiving map data and other data from a server (not depicted) and supplying map data and other data to the vehicle control section 28. It should be noted that map data may be stored in the storage section 35 in advance such that the vehicle control section 28 acquires the map data from the storage section 35. Further, the communication section 27 starts receiving various types of traffic information from roadside units (not depicted) and supplying the traffic information to the vehicle control section 28.

It should be noted that LDMs, map data, and other map-related information will be hereinafter collectively referred to as map information.

The surrounding area monitoring section 121 starts monitoring the surrounding area of the vehicle on the basis of the surrounding area image from the surrounding area photography section 21, the surrounding area information from the surrounding area information acquisition section 22, and various types of information from the communication section 27.

The route setting section 151 corrects, as appropriate, the current position of the vehicle on the basis of information acquired from the surrounding area monitoring section 121 and vehicle acceleration, angular speed, and other information included in the vehicle information supplied from the vehicle information acquisition section 25. As a result, for example, information in the map information whose successive changes have yet to be reflected and estimation error of the current position of the vehicle caused by an error of the position measurement section 23 or other error are corrected.

In step S5, the route setting section 151 starts setting a traveling route. Specifically, the route setting section 151 sets a traveling route from the current position to the destination in consideration of the driver's driving capability on the basis of the map information. Also, the route setting section 151 changes the traveling route as appropriate on the basis of information such as a time zone, and weather, traffic jam, and traffic restriction en route to the destination.

In step S6, the automation level setting section 152 starts updating the automation level.

Specifically, the automation level setting section 152 sets a distribution of permissible automation levels on the traveling route on the basis of the map information, the surrounding area information, and other information. Here, the permissible automation level refers to a maximum value of the automation level that can be set in a target zone. For example, in a zone whose permissible automation level is level 3, the vehicle can travel with its automation level set to level 3 or lower.

For example, the automation level setting section 152 sets the distribution of permissible automation levels on the traveling route to a default value indicated on the map information or other information. Then, the automation level setting section 152 updates, as appropriate, the distribution of permissible automation levels on the traveling route on the basis of information regarding the traveling route and its surrounding environment such as weather, a road condition, accidents, works, traffic restrictions, and so on.

For example, in a zone where it is difficult to recognize road signs such as road lane markings including road studs, paint, and stones, and symbols, and characters, due, for example, to snowing, the permissible automation level is reduced from level 3, a level set under normal circumstances, to level 2, or the use of LKAS is prohibited. For example, in a zone where visibility is poor due, for example, to smoke caused by a fire or dense fog, the permissible automation level is reduced from level 3, a level set under normal circumstances, to level 2, or the maximum speed is restricted. For example, in a zone where an accident took place or a falling object was detected, the permissible automation level is reduced to level 1 or 0. For example, in a zone where the road surface is frozen or on a bridge exposed to severe crosswinds, the speed limit is reduced, or the permissible automation level is reduced to level 1 or 0.

A description will be given here of a specific example of distribution of permissible automation levels with reference to FIG. 7.

In a zone S1 between a point P1 and a point P2, LDM update information is available, and the zone S1 is straight with clear road signs. As a result, the permissible automation level is set to level 3.

In a zone S2 between the point P2 and a point P3, LDM update information is available. In the zone S2, however, accidents involving persons jumping out in front of vehicles have been frequent. As a result, the permissible automation level is set to level 2.

In a zone S3 between the point P3 and a point P4, LDM update information is available, and the zone S3 is straight with clear road signs. As a result, the permissible automation level is set to level 3.

In a zone S4 between the point P4 and a point P5, LDM update is delayed or insufficient, and there is a possibility that the road surface may be frozen at night in winter in this zone. As a result, the permissible automation level is set to level 1.

It should be noted that an emergency parking zone 201 including the point P4 is provided near a boundary between the zone S3 and the zone S4 so that vehicles whose drivers have been unable to resume driving maneuvers during transition from automation level 3 to level 2 or lower can take shelter and malfunctioning vehicles, emergency vehicles, and other types of vehicles can park.

In a zone S5 between the point P5 and a point P6, LDM update information is available. However, a number of vehicles are parked on the road, and visibility is poor. As a result, the permissible automation level is set to level 1.

In a zone S6 between the point P6 and a point P7, LDM update information is available, and the zone S6 is straight with clear road signs. As a result, the permissible automation level is set to level 3.

It should be noted that a rest area 202 is provided within the zone S6 where automated driving vehicles can take shelter in an emergency.

In a zone S7 between the point P7 and a point P8, LDM update is delayed or insufficient, and a safety level has yet to be defined. As a result, the permissible automation level is set to level 1.

It should be noted that an emergency parking zone 203 is provided within a given range from the point P7 in the zone S7.

In a zone S8 between the point P8 and a point P9, LDM update information is available, and the zone S8 is straight with clear road signs. As a result, the permissible automation level is normally set to level 3. However, visibility is poor at present in the zone S8 due to bad weather, and the permissible automation level is restricted to level 2.

It should be noted that if there is a possibility that the automation level may be frequently reduced to a lower level due, for example, to a meteorological condition or other cause even in a zone where the automation level 3 is normally available, an emergency parking zone 204 is provided, for example, halfway along the zone as in the zone S8. Also, for example, in the case where decline in the driver's level of driving maneuvers is anticipated before entry into the point P9, the emergency parking zone 204 is used as a place where vehicles can proactively take shelter.

In a zone S9 between the point P9 and a point P10, automated driving is prohibited. As a result, the permissible automation level is set to level 0.

In a zone S10 between the point P10 and a point P11, LDM update information is available, and the zone S10 is straight with clear road signs. As a result, the permissible automation level is set to level 3.

It should be noted that a rest area 205 is provided near the point P10 in the zone S10 where automated driving vehicles can take shelter in an emergency. The rest area 202 and the rest area 205 are used, for example, as places where vehicles are forcefully halted (described later).

Then, the automation level setting section 152 starts a process of updating, as appropriate, the automation level of the vehicle on the basis of the distribution of permissible automation levels and the current position.

For example, the automation level setting section 152 automatically changes the automation level of the vehicle in keeping with the permissible automation level. Alternatively, for example, the automation level setting section 152 may automatically reduce the automation level in a zone where the permissible automation level is lower than the automation level of the vehicle and increase the automation level in a zone where the permissible automation level is higher than the automation level of the vehicle.

In step S7, the vehicle control system 11 starts monitoring the driver.

Specifically, the driver photography section 101 of the driver monitoring section 26 starts photographing the driver and supplying the driver's image acquired by the photography to the vehicle control section 28.

The biological information acquisition section 102 starts acquiring biological information of the driver and supplying the biological information to the vehicle control section 28.

The line-of-sight detection section 103 starts detecting the orientation of the driver's face, the orientation of the line of sight, blinking, and the eyeball movement (e.g., vision fixation, saccade) and supplying the detection result to the vehicle control section 28.

The driving behavior analysis section 141 starts analyzing driver's driving behaviors on the basis of the driver's image, vehicle information, the learning result of the learning section 127, and so on.

The driver's condition detection section 142 starts detecting the driver's condition on the basis of the driver's image, biological information of the driver, the detection result of the line-of-sight detection section 103, the authentication result of the authentication section 104, the learning result of the learning section 127, and so on.

For example, the driver's condition detection section 142 starts detecting the driver's posture, behaviors, and so on.

Also, for example, the driver's condition detection section 142 detects the driver's responsiveness, awakening level, and other factors. Here, the driver's responsiveness is defined on the basis of presence or absence of the driver's response to an external request, instruction, or stimulus or to an obstacle present in the traveling direction of the vehicle, response speed, appropriateness of the response, and so on. The driver's responsiveness declines not only in the case where the driver's awakening level declines but also in the case where the driver's consciousness is not directed toward driving and in the case where the driver does not respond intentionally.

Among examples of detection methods of the driver's responsiveness and awakening level are passive monitoring and active monitoring.

Passive monitoring detects the driver's responsiveness and awakening level by passively observing the driver's condition.

For example, the driver's responsiveness and awakening level are detected on the basis of the orientation transition of the driver's face, the orientation transition of the line of sight, frequency of blinking, transition of the eyeball movement, and so on. For example, driver's attentiveness such as movement of the line of sight toward the target and vision fixation is observed on the basis of the movement of the driver's line of sight toward a direction of information acquired by the surrounding area photography section 21, the surrounding area information acquisition section 22, and so on, and the driver's responsiveness and awakening level are detected on the basis of the result thereof.

For example, the driver's awakening level is detected on the basis of driver's biological information such as a heart rate and body odor.

For example, changes of the driver's responsiveness and awakening level are detected by observing successive changes of the driver's driving maneuvers such as steering stability and maneuvering speed of the steering wheel, steering stability and maneuvering speed of the accelerator pedal, brake pedal, and so on. It should be noted that these responses have characteristics inherent to each driver. Therefore, characteristics appropriate to the circumstances of the driver may be learned such that the driver's awakening level is detected on the basis of the learning result thereof.

Active monitoring detects the driver's responsiveness and awakening level by giving a visual, auditory, tactile or other type of stimulus, instruction, and so on to the driver and observing the driver's response to the stimulus, instruction, or event given. For example, active monitoring is used in the case where it is difficult to detect the driver's responsiveness and awakening level through passive monitoring and in order to improve the detection accuracy. For example, if the automation level is level 3 or higher, there is a case in which the driver's intervention in steering equipment is completely interrupted. Therefore, the driver's response cannot be detected by monitoring the maneuvering condition of the steering equipment. For this reason, active monitoring is effective for reliably grasping the driver's condition. That is, active monitoring includes functionality to complement passive monitoring. Also, active monitoring is used to awaken the driver by giving a stimulus to the driver.

For example, the driver's condition detection section 142 detects the driver's responsiveness and awakening level by controlling the display section 29 and causing the display section 29 to display a short word or number within the driver's field of view and causing the driver to read out the word or number or causing the display section to display a simple mathematic formula and causing the driver to utter the calculation result.

For example, the driver's condition detection section 142 detects the driver's responsiveness and awakening level by controlling the display section 29, causing the display section 29 to display a pseudo target that is used as a target for the driver's line of sight within the driver's field of view, and tracking the movement of the driver's line of sight.

For example, the driver's condition detection section 142 detects the driver's responsiveness and awakening level by controlling the audio output section 30, issuing a simple instruction (e.g., swing the head sideways), and observing the driver's response to the instruction.

For example, the driving support control section 153 controls the traveling control section 33 in accordance with an instruction of the driver's condition detection section 142 and causes the vehicle to travel in an unnatural manner to the extent that safety is secured. Then, the driver's condition detection section 142 detects the driver's responsiveness and awakening level on the basis of the driver's response to the unnatural traveling.

For example, the traveling control section 33 performs control such that the steering wheel and the traveling direction of the vehicle fall out of balance. For example, the traveling control section 33 causes the vehicle to meander for a given time period by changing the direction of wheels or applying horizontally imbalanced braking loads in the case where the steering wheel is not maneuvered. In response, the driver's condition detection section 142 detects the driver's responsiveness and awakening level on the basis of whether or not the driver maneuvers the steering wheel in such a manner as to correct the meandering, the response speed, and so on. It should be noted that how much the vehicle is to be meandered should preferably be set to the extent that the driver performs driving maneuvers in such a manner as to unconsciously correct the meandering. Also, for example, in the case where the vehicle travels normally along a lane, the vehicle-mounted apparatus control section 34 applies, in a simulated manner and to the steering wheel, a rotational load equivalent to the case where the vehicle meanders. In response, the driver's condition detection section 142 detects the driver's responsiveness and awakening level on the basis of whether or not the driver maneuvers the steering wheel in such a manner as to halt the rotation, the response speed, and so on.

It should be noted that if, for example, the driving in a meandering manner continues due to lack of response by the driver, it is possible to inform vehicles behind that some kind of danger may arise due to the decline in the driver's responsiveness or awakening level. Also, in the case where the driving in a meandering manner continues due to lack of response by the driver, an anomalous condition is notified externally via the communication section 27 or other section.

For example, the traveling control section 33 changes the traveling direction of the vehicle such that the vehicle departs slightly from the lane for a given time period. In response, in the case where the driver pays attention to the forward direction normally, the driver is expected to steer in such a manner as to correct the vehicle's direction. Therefore, the driver's condition detection section 142 detects the driver's responsiveness and awakening level on the basis of whether or not the driver maneuvers the steering wheel in such a manner as to bring the vehicle back into the lane, the response speed, and so on. It should be noted, however, that if the traveling direction of the vehicle is changed unconditionally, a hazardous situation may arise depending on the positional relationship with surrounding vehicles. Also, there is a possibility that a following vehicle behind may be in pursuit. Therefore, this detection method should preferably be carried out to the extent that the surrounding vehicles are not adversely affected by making an overall determination on complex conditions such as conditions of the surrounding vehicles, psychological impact of the driver, and so on.

For example, the driving support control section 153 sets a distance to a preceding vehicle longer than normal in the case where ACC is enabled. In response, the driver's condition detection section 142 detects the driver's responsiveness and awakening level on the basis of whether or not the driver maneuvers the accelerator pedal in such a manner as to bring the vehicle-to-vehicle distance back to the normal length, the response speed, and so on.

For example, the traveling control section 33 increases or reduces a change amount of the traveling direction of the vehicle as compared to normal relative to the amount of steering of the steering wheel. In response, the driver's condition detection section 142 detects the driver's responsiveness and awakening level on the basis of whether or not the driver maneuvers the steering wheel in such a manner as to adjust the traveling direction to a desired direction, the response speed, and so on. It should be noted that the difference in the change amount of the traveling direction of the vehicle as compared to normal should preferably be set to the extent that the driver performs driving maneuvers in such a manner as to unconsciously correct the traveling direction.

For example, the traveling control section 33 increases or reduces an acceleration of the vehicle as compared to normal relative to the amount of depression of the accelerator pedal. In response, the driver's condition detection section 142 detects the driver's responsiveness and awakening level on the basis of whether or not the driver maneuvers the accelerator pedal in such a manner as to adjust the vehicle's speed to a desired speed, the response speed, and so on. It should be noted that the difference in acceleration as compared to normal should preferably be set to the extent that the driver performs driving maneuvers in such a manner as to unconsciously correct the acceleration.

For example, the traveling control section 33 increases or reduces a deceleration of the vehicle as compared to normal relative to the amount of depression of the brake pedal. In response, the driver's condition detection section 142 detects the driver's responsiveness and awakening level on the basis of whether or not the driver maneuvers the brake pedal in such a manner as to adjust the vehicle's speed to a desired speed, the response speed, and so on. It should be noted that the difference in deceleration as compared to normal should preferably be set to the extent that the driver performs driving maneuvers in such a manner as to unconsciously correct the deceleration.

For example, in the case where autonomous/automated driving is in progress with no need for driver intervention, and when the driver is manipulating the mobile terminal 12 (information processing apparatus), the driver's condition detection section 142 causes a sub-window to be displayed on a screen of the mobile terminal 12 via the communication section 27, with an instruction to the driver appearing in the sub-window. Then, the driver's condition detection section 142 detects the driver's responsiveness and awakening level on the basis of whether or not the driver properly responds to the instruction, the response speed, and so on.

For example, in the case where although looking ahead, the driver's consciousness toward driving is low because the driver has something to think about, there is a case where it is difficult to detect the driver's responsiveness and awakening level through passive monitoring. In response, active monitoring provides improved accuracy in detecting the driver's responsiveness and awakening level.

It should be noted that, in addition to the above, a state of consciousness, a mental state, a state of nervousness, a degree of drug influence, and other driver's condition may be detected.

The driving intervention level detection section 143 starts detecting the driver's driving intervention level on the basis of the analysis result of the driving behaviors and the detection result of the driver's condition.

In step S8, the learning section 127 starts the learning process.

For example, the learning section 127 starts learning a correlation between the driver's driving capability and the driver's various detectable conditions on the basis of the analysis result of the driving behavior analysis section 141.

For example, the learning section 127 starts learning biological information, driver's motions, and tendencies of the driver's driving maneuvers during normal manual driving. For example, the learning section 127 constantly learns the correlation between the driver's inherent characteristics in keeping with traveling conditions and normal driving characteristics while being awake. The driver's inherent characteristics include behavior of the driver's line of sight, head posture, body posture, pulse wave, respiratory condition, and pupillary reaction to external light when the driver performs driving maneuvers stably including driving stably in the lane center, stably coming to a stop at traffic lights and other locations, and properly decelerating into curves. Passive monitoring accuracy, for example, improves by using this learning result.

For example, the learning section 127 starts learning the driver's characteristics of response to active monitoring in such a manner as to allow distinction between normal and abnormal states. Active monitoring accuracy, for example, improves by using this learning result.

It should be noted that any learning method can be used for the above learning including, for example, simple correlation learning to complicated artificial intelligence learning such as a CNN (Convolutional Neutral Network). As described above, learning the driver's inherent characteristics in keeping with each condition ensures that the driver's driving capability is detected more accurately on the basis of the authenticated driver's condition (e.g., driver's health condition and fatigue level).

Then, the learning section 127 causes the storage section 35 to store the learning result. It should be noted that the learning result may be not only stored in the vehicle for reuse but also stored separately in an electronic key, a remote server, or other location so that the learning result can be readily used in other vehicles. Also, in the vehicle repeatedly used by the driver, the learning result at the time of previous use may be loaded to determine its obsolescence such that a learning dictionary acquired up until the previous use is used as initial data.

In step S9, the driving support control section 153 starts driving support. That is, the driving support control section 153 starts a driving support process such as an ACC, an LKAS, a TJA, or an AEBS by controlling the traveling control section 33 in keeping with its current automation level.

In step S10, the driving intervention level detection section 143 determines whether or not the driving intervention level is insufficient.

Here, the required driving intervention level varies depending on the automation level set.

In the case where the automation level is set to level 0, the driver is required to perform all driving tasks as described above. Therefore, the driver is required, as a driver's driving intervention level, to keep the driver's line of sight and attention toward the traveling direction of the vehicle and be able to perform necessary driving maneuvers.

In the case where the automation level is set to level 1, the driver is required to perform some driving tasks as described above. Therefore, the driver is required, as a driver's driving intervention level, to keep the driver's line of sight and attention toward the traveling direction of the vehicle and be able to perform necessary driving maneuvers. Here, the required driving intervention level is approximately similar to that in the case of the automation level 0 except that the number of types of required driving maneuvers is smaller.

In the case where the automation level is set to level 2, the driver is required to perform some driving tasks as described above. Therefore, the driver is required, as a driver's driving intervention level, to keep driver's line of sight and attention toward the traveling direction of the vehicle and be able to perform necessary driving maneuvers. Here, the required driving intervention level is approximately similar to that in the case of the automation levels 0 and 1 except that the number of types of required driving maneuvers is smaller.

In the case where the automation level is set to level 3, the automated driving system basically performs all driving tasks as described above. On the other hand, the driver is expected to respond properly to a system request or other event, for example, by performing driving maneuvers during a preliminary response (fallback). Therefore, the driver is not required, as a driver's driving intervention level, to keep the driver's line of sight and attention toward the traveling direction of the vehicle, but, is required to respond to a vehicle's request within a given time period. Also, in the case where the automation level changes from level 3 to a lower level, the driver desirably returns to the driving intervention level of the next automation level before the automation level changes.

In the case where the automation level is set to level 4, the automated driving system performs all the driving tasks as described above. Also, the driver is not expected to perform driving maneuvers and so on during a preliminary response (fallback). Therefore, the driver is basically not required to intervene in driving of the vehicle. It should be noted, however, that in the case where the automation level changes from level 4 to a lower level, the driver desirably returns to the driving intervention level of the next automation level before the automation level changes.

In the case where the automation level is set to level 5, the automated driving system performs all the driving tasks. Therefore, the driver is not required to intervene in driving of the vehicle.

Therefore, in the case where the automation level is set to level 4 or 5, the driver is not required to intervene in driving. As a result, it is unconditionally determined that the driving intervention level is not insufficient.

On the other hand, in the case where the automation level is set to any one of levels 0 to 3, and when the state in which the condition for the current automation level is not satisfied continues for a given time period or more, the driving intervention level detection section 143 determines that the driving intervention level is insufficient, and the process proceeds to step S11.

For example, in the case where the automation level is set to any one of levels 0 to 2, and when the state in which the driver does not keep the line of sight and attention toward the traveling direction of the vehicle continues for a given time period or more, and for example, in the case where the driver goes off track after being late in maneuvering the steering equipment as compared to normal, and when so-called staggering is detected as a result of a sudden steering maneuver for bringing the vehicle back on track, it is determined that the driving intervention level is insufficient, and the process proceeds to step S11.

For example, in the case where the automation level is set to level 3, and in the case where the driver does not respond properly within a given time period despite the fact that an instruction has been given to the driver through active monitoring, it is determined that the driving intervention level is insufficient, and the process proceeds to step S11.

It should be noted that even if there is a zone where the vehicle can travel in automation level 4, it is not always possible for the vehicle to travel in automation level 4 in all stages. Therefore, even in the case where the automation level is set to level 4, the driving intervention level may also be determined through active monitoring as in the case where the automation level is set to level 3 on the assumption that the automation level changes to a lower level.

In step S11, the vehicle control system 11 performs a driving intervention level correction process, and then the process proceeds to step S15.

A detailed description will be given here of the driving intervention level correction process with reference to the flowchart illustrated in FIG. 8.

In step S41, the driving intervention level detection section 143 determines whether or not insufficient driving intervention level has been frequent. For example, in the case where the number of occurrences of insufficient driving intervention level from the beginning of the driver monitoring in the process in step S7 in FIG. 5 is less than a given threshold, and in the case where the frequency of occurrences of insufficient driving intervention level within an immediately previous given time period (e.g., 10 minutes) is less than a given threshold, the driving intervention level detection section 143 determines that insufficient driving intervention level has not been frequent, and the process proceeds to step S42.

In step S42, the vehicle control system 11 alerts the driver.

For example, the display section 29 displays, under control of the notification control section 124 and within the driver's field of view, a warning screen and so on urging the driver to exercise caution. At this time, in the case where the driver manipulates the mobile terminal 12, a warning screen and so on appear, for example, on the screen of the mobile terminal 12.

Figure 9:
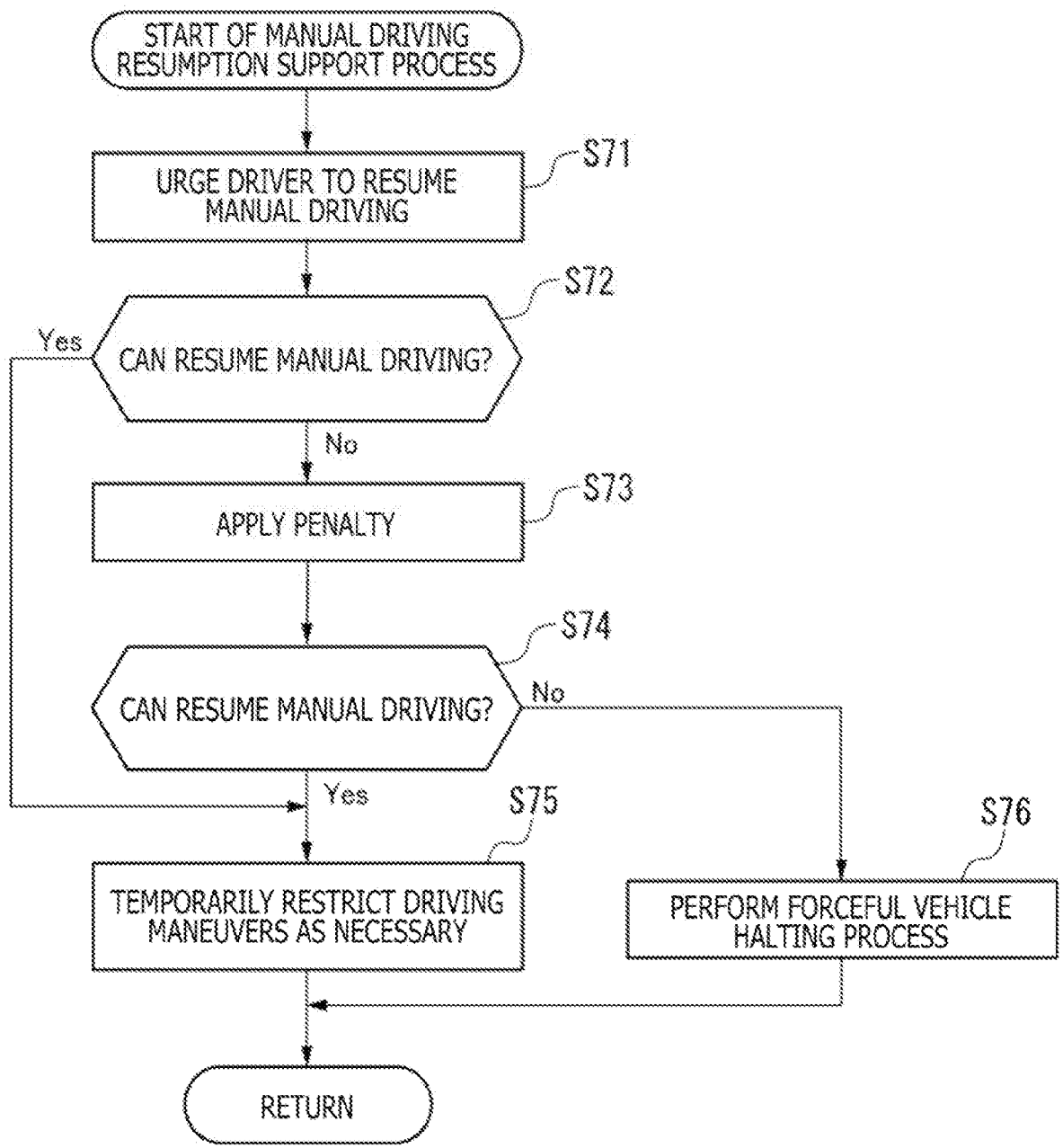
FIG. 9 is a flowchart for describing in detail a manual driving resumption support process.

As a warning screen displayed on this mobile terminal 12, for example, a pop-up window displays, in a traveling direction display screen, that the vehicle is approaching a point where the driver is urged to resume manual driving in step S71 of FIG. 9 and so on which will be described later. This traveling direction display screen displays, for example, a two-dimensional map or a one-dimensional bar indicating the position on the traveling route.

Also, for example, the manner in which a warning screen appears on the mobile terminal 12 may be changed in keeping with the required time or distance to the point where manual driving is required to be resumed. For example, in the case where the required time to the point where manual driving is required to be resumed exceeds five minutes, a warning screen with small green frame appears. This warning screen is resized to occupy 10% of the screen space of the mobile terminal 12 when the required time reaches five minutes. The warning screen is resized to occupy one third of the screen space of the mobile terminal 12 when the required time reaches two minutes, and the frame of the warning screen turns red and blinks.

Further, for example, in the case where a warning screen appears, for example, the state of manipulation may be forcefully stored, followed by automatically placing the mobile terminal 12 into standby for later resumption from the same state or forcefully turning off the screen of the mobile terminal 12 in order to prevent the driver from manipulating the mobile terminal 12 in a hurry.

For example, the audio output section 30 outputs an audio message, an alarm, a buzzer, a beeping sound, a pseudo car horn (honking) that can only be heard inside the following vehicle, and so on under control of the notification control section 124 to urge the driver to exercise caution.

For example, the light-emitting section 31 lights up or flashes a lamp or other light source under control of the notification control section 124 to urge the driver to exercise caution.

For example, the vehicle-mounted apparatus control section 34 gives, under control of the notification control section 124, a haptic feedback such as causing the driver's seat or the steering wheel to vibrate or pulling a seat belt. It should be noted that in the case where the seat is caused to vibrate, for example, vibrations similar to those produced at the time of crossing of a rumble strip or a road stud by the vehicle may be transmitted to the driver.

For example, in accordance with an instruction of the notification control section 124, the driving support control section 153 controls the steering of the vehicle by controlling the traveling control section 33 such that vibrations similar to those produced at the time of crossing of a rumble strip or a road stud by the vehicle are transferred to the driver.

It should be noted that this alert should preferably not give a sense of discomfort to the driver to the extent possible.

In step S43, the driving intervention level detection section 143 determines whether or not the insufficient driving intervention level has been resolved. In the case where the driving intervention level has yet to satisfy the condition for the current automation level, the driving intervention level detection section 143 determines that the insufficient driving intervention level has yet to be resolved, and the process proceeds to step S45.

On the other hand, in step S41, in the case where the number of occurrences of insufficient driving intervention level from the beginning of the driver monitoring is equal to or more than a given threshold, or in the case where the frequency of occurrences of insufficient driving intervention level within the immediately previous given time period is equal to or more than the given threshold, the driving intervention level detection section 143 determines that insufficient driving intervention level has been frequent, and the process proceeds to step S44.

In step S44, the penalty application section 125 determines whether or not penalty applications have been frequent. For example, in the case where the number of penalty applications from the beginning of the driver monitoring is less than a given threshold, and in the case where the frequency of penalty applications within an immediately previous given time period (e.g., 30 minutes) is less than a given threshold, the penalty application section 125 determines that penalty applications have not been frequent, and the process proceeds to step S45.

In step S45, the driver's condition detection section 142 determines whether or not a dangerous situation is present. Here, the dangerous situation refers, for example, to a situation in which the driver is unable to resume the requested driving intervention level at once or drive properly, for example, because the driver is unconscious, fast asleep, or drunk. Then, in the case where it is determined that a dangerous situation is not present, the process proceeds to step S46.

In step S46, the vehicle control system 11 applies a penalty.

Here, penalties can be classified into those applied during driving and others applied after driving. Going into more details, penalties applied during driving are those applied until a destination is reached or those applied until the vehicle comes to a forceful stop and will be hereinafter referred to as while-driving penalties. Penalties applied after driving are those applied after a destination is reached or those applied after the vehicle comes to a forceful stop and will be hereinafter referred to as post-penalties. Penalties applied in this step are while-driving penalties.

A description will be given below of specific examples of while-driving penalties.

Penalties involving a bodily sensation, penalties for increasing loads on the driver, and penalties for changing the traveling route are among while-driving penalties. These penalties are not clearly distinguished from each other, and one penalty may correspond to a plurality of types of penalties.

For example, the penalty application section 125 gives a sense of discomfort to the driver by reinforcing the alert given to the driver in step S42. For example, a volume of the audio message, the alarm, the buzzer, the beeping sound, the pseudo honking, or other is increased as compared to when the alert is given, or an unpleasant tone such as discord is output. For example, a light intensity of the lamp or other light source for urging the driver to exercise caution is increased. For example, the intensity of a haptic feedback is increased as compared to when the alert is given.

For example, the penalty application section 125 brings the backrest of the driver's seat closer to the vertical direction relative to the seating surface by controlling the vehicle-mounted apparatus control section 34. This forces the driver to take an unpleasant posture.

For example, the penalty application section 125 produces a bad odor for a short time period by controlling the odor generation section 32. This bad odor should preferably be deodorized after having been produced for a short time period. For example, a deodorizing liquid is sprayed in a given time period after a liquid having a bad odor has been sprayed.

For example, the penalty application section 125 restricts the upper limit speed of the vehicle for a given time period (e.g., two, five, or ten minutes) by controlling the traveling control section 33. This causes the driver to feel a sense of discomfort because of the incapability of speeding and be late in arrival at the destination.

For example, the penalty application section 125 performs unpleasant braking control by controlling the traveling control section 33. For example, even if the driver depresses the brake pedal, the vehicle does not decelerate smoothly, and instead, the degree of deceleration increases or decreases, causing the vehicle to continue to travel in a manner unpleasant to the driver. It should be noted, however, that in the case where there are vehicles behind, it is desirable that these vehicles should not be adversely affected.

For example, the penalty application section 125 instructs the route setting section 151 to change the traveling route to a route different from an ideal route. As a result, the traveling route is changed to a roundabout route so that the vehicle arrives at the destination late. Also, for example, the traveling route is changed to a route where manual driving is essential. Alternatively, for example, the traveling route is changed, for example, such that a route is avoided where traveling in automation level 3 or higher is permitted. This leads to increased loads on the driver and causes the vehicle to arrive at the destination late.

For example, the penalty application section 125 instructs the driving support control section 153 to reduce the automation level. As a result, the automation level is reduced to level 2 or lower, thus resulting in increased loads on the driver. Also, for example, the penalty application section 125 instructs the driving support control section 153 to disable some of driving support functions (e.g., ACC, LKAS).

The reduction of the automation level and the restriction of the driving support functions may be forcefully continued for a given time period. Alternatively, for example, the automation level may be allowed to be restored to the original level only if the driver goes through a complicated maneuver or thinking routine. In the latter case, an effect of awakening the driver can also be anticipated.

It should be noted that in the case where a penalty is repeatedly applied, it is desirable that the type, the severity, and the duration of a penalty applied should be changed moderately in order to prevent the driver from becoming accustomed to penalties.

Also, for example, the penalties may be ranked according to the severity of disadvantage experienced by the driver. Also, even the penalties of the same type may be ranked according to the severity, the duration, and so on. As a result, for example, the greater the disadvantage experienced by the driver, the higher the penalty is ranked.

Then, for example, the rank of the penalty applied may be increased as the number of penalty applications increases.

Further, concurrently with increase in the rank of penalty applied, the point where the driver is urged to resume manual driving in step S71 of FIG. 9 and so on which will be described later may be changed to a closer point. This achieves a penalty effect of shortening the autonomous/automated driving zone. Also, a transition time period until manual driving is resumed is lengthened, thus allowing the transition to manual driving to take place more safely.

In step S47, it is determined whether or not the insufficient driving intervention level has been resolved as in the process in step S43. In the case where the driving intervention level satisfies the condition for the current automation level, it is determined that the insufficient driving intervention level has been resolved, and the process proceeds to step S48. That is, in the case where the driving intervention level is corrected by applying a penalty, the process proceeds to step S48.

It should be noted that in the case where the application of a penalty continues, the penalty application is halted at this point in time.

On the other hand, in the case where the driving intervention level satisfies the condition for the current automation level in step S43, it is determined that the insufficient driving intervention level has been resolved, and the process proceeds to step S48. That is, in the case where the driving intervention level is corrected by alerting the driver, the process proceeds to step S48.

It should be noted that in the case where the alerting of the driver continues, the alerting is halted at this point in time.

In step S48, the driving support control section 153 temporarily restricts driving maneuvers as necessary.

For example, if the driver maneuvers the steering wheel, the accelerator pedal, or the brake pedal impatiently in a haze after awakening from dozing, the driver is likely to improperly turn the vehicle, suddenly accelerate the vehicle, suddenly stop the vehicle, or perform other improper driving maneuvers, possibly resulting in an accident.

For this reason, the driving support control section 153 temporarily establishes a restriction to the driving maneuvers in keeping with the driver's condition prior to the correction of the driving intervention level. For example, in the case where the driver awakens from a low awakening level condition such as dozing, the driving support control section 153 temporarily disables the maneuvering of the steering wheel, the accelerator pedal, or the brake pedal, and during that time period, the autonomous/automated driving of the vehicle continues. Then, the driving support control section 153 imposes, on the driver, a maneuver or an action for enabling the maneuvering of the steering wheel, the accelerator pedal, or the brake pedal.

For example, the notification control section 124 notifies the maneuver or the action to be performed by the driver with an image or a sound by controlling the display section 29 or the audio output section 30 in accordance with an instruction from the driving support control section 153.

For example, an instruction such as "place your foot on the accelerator pedal (or the brake pedal) and slightly depress," "repeat the action of slightly depressing the accelerator pedal (or the brake pedal) 10 times," "slightly depress the accelerator pedal (or the brake pedal) concurrently with the lighting-up of the lamp," or "hold the steering wheel and slightly turn to the left and right" is given to the driver. Alternatively, for example, an instruction is given to the driver to perform a similar maneuver or action as in the case where the driver's responsiveness and awakening level are detected through active monitoring described above.

Then, in the case where the driver successfully performs the given maneuver or action in accordance with the instruction, the driving support control section 153 enables the maneuvering of the steering wheel, the accelerator pedal, or the brake pedal and switches the vehicle from autonomous/automated driving to manual driving.

As described above, the driving maneuvers are restricted until the driver properly responds to the instruction given.

Thereafter, the driving intervention level correction process is terminated.

On the other hand, in the case where it is determined that the insufficient driving intervention level has yet to be resolved in step S47, that is, the driving intervention level has not been corrected despite the application of a penalty, the process proceeds to step S49.

Also, in the case where the number of penalty applications from the beginning of the driver monitoring is equal to or more than the given threshold, or in the case where the frequency of penalty applications within the immediately previous given time period is equal to or more than the given threshold, the penalty application section 125 determines that penalty applications have been frequent in step S44, and the process proceeds to step S49.

In step S49, the automation level setting section 152 determines whether or not autonomous/automated driving is in progress. In the case where the current automation level is level 2 or lower, the automation level setting section 152 determines that autonomous/automated driving is not in progress, and the process proceeds to step S50.

Also, in step S45, in the case where a dangerous situation is present, the process proceeds to step S50.

In step S50, the vehicle control system 11 performs a forceful vehicle halting process. For example, in case of an urgency, the route setting section 151 searches, on the basis of map information, for the nearest location on the traveling route where emergency or other vehicles can be parked (e.g., emergency parking area, safety zone, store's parking zone) and sets the detected location (e.g., emergency parking zone 201 in FIG. 7) as a place where the vehicle will be forcefully halted (hereinafter referred to as a forceful halting location).

Figure 7:
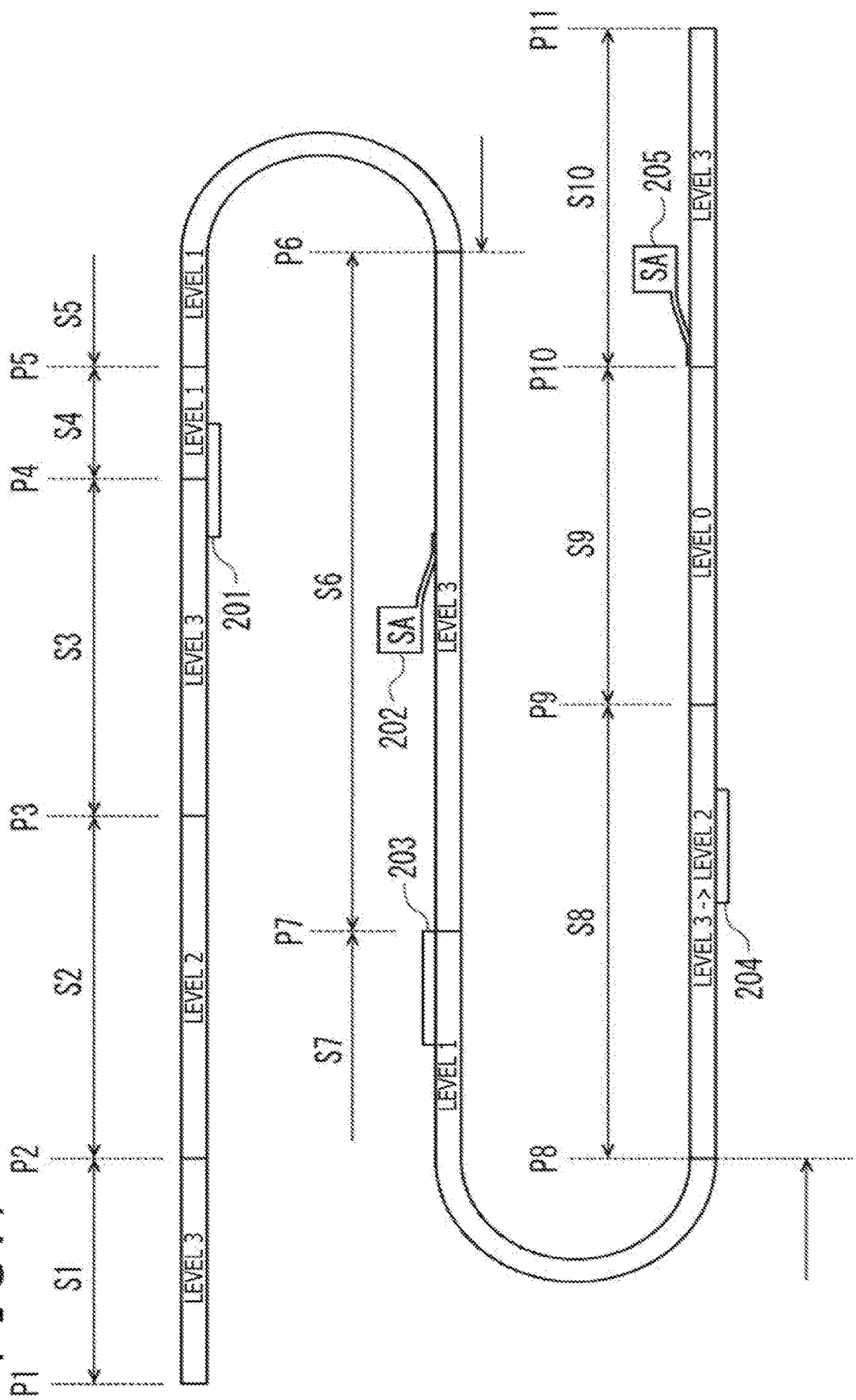
FIG. 7 is a diagram illustrating a specific example of distribution of permissible automation levels.

Also, for example, in the case of a not-so-urgent situation, the route setting section 151 searches, on the basis of map information, for the nearest parking area or rest area (e.g., rest area 202 in FIG. 7). In the case where a parking area or a rest area is available within a given range, and in the case where the parking area or the rest area can be reached without passing a route where manual driving is required, the route setting section 151 sets the parking area or the rest area as a forceful halting location. On the other hand, in the case where a parking area or a rest area is not available within the given range, or in the case where a parking area or a rest area cannot be reached without passing a route where manual driving is required, a forceful halting location is searched for and set by the route setting section 151 in a manner similar to that in case of an urgency.

The driving support control section 153 halts the vehicle at the set forceful halting location by controlling the traveling control section 33 or other section. At this time, the vehicle decelerates or slows down as necessary. Also, an SOS is sent after the vehicle has been halted as necessary.

It should be noted that it is also assumed that the driver may forcefully switch to manual driving for forceful resumption of driving before the vehicle is halted at a forceful halting location. In this case, there is a possibility that the driver may not be sufficiently awake. Therefore, it is desirable that the driver should switch to manual driving step by step.

Thereafter, the driving intervention level correction process is terminated.

On the other hand, in step S49, in the case where the current automation level is level 3 or higher, the automation level setting section 152 determines that autonomous/automated driving is in progress, and the process proceeds to step S51.

In step S51, a manual driving resumption support process is performed, after which the driving intervention level correction process is terminated.

A detailed description will be given here of the manual driving resumption support process with reference to the flowchart illustrated in FIG. 9.

In step S71, the notification control section 124 urges the driver to resume manual driving.

For example, the display section 29 displays, under control of the notification control section 124, a message urging the driver to resume manual driving within the driver's field of view.

For example, the audio output section 30 outputs, under control of the notification control section 124, a message, an alarm, a buzzer, a beeping sound, or other to urge the driver to resume manual driving.

It should be noted that this notice should preferably be given in such a manner as not to give a sense of discomfort to the drier to the extent possible. It should be noted, however, that increasing, as a method of notification, the volume from a level not giving a sense of discomfort to a level giving a sense of discomfort step by step may cause the driver to think the notice is part of a dream during a nap, for example, in the case where the driver is taking a nap. In response, a plurality of notification methods may be sequentially switched in the order of an alarming sound, a message, haptic vibration, and a buzzer, for example.

In step S72, the driving intervention level detection section 143 determines whether or not manual driving can be resumed. In the case where the driving intervention level does not satisfy the condition for the automation level after the change (after manual driving is resumed), the driving intervention level detection section 143 determines that manual driving cannot be resumed, and the process proceeds to step S73.

Figure 8:
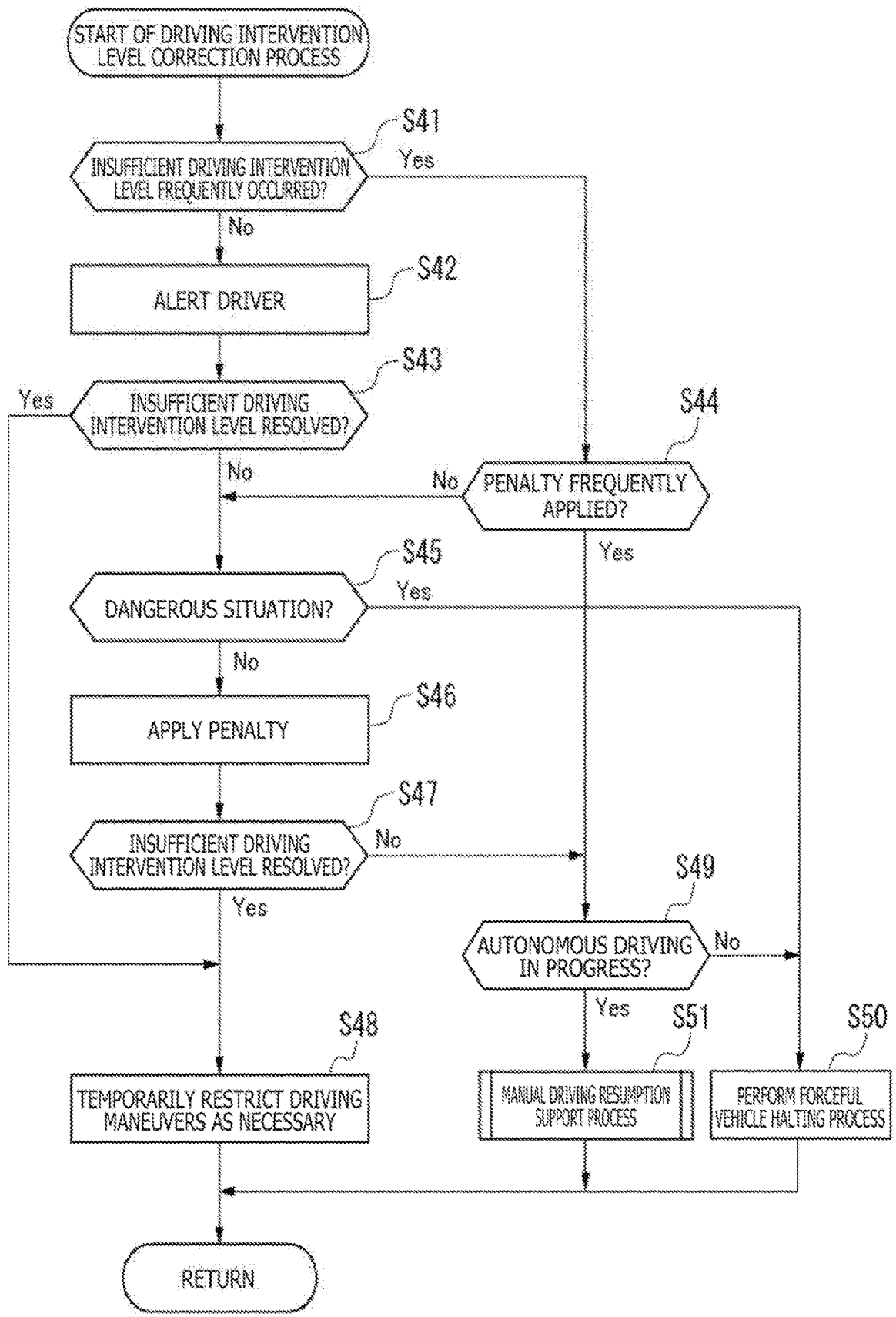
FIG. 8 is a flowchart for describing in detail a driving intervention level correction process.

In step S73, a penalty is applied as in the process in S46 in FIG. 8.

In step S74, it is determined whether or not manual driving can be resumed as in the process in step S72. In the case where the driving intervention level satisfies the condition for the automation level after the change (after manual driving is resumed), the driving intervention level detection section 143 determines that manual driving can be resumed, and the process proceeds to step S75. That is, in the case where the driver has corrected the driving intervention level and is ready to resume manual driving as a result of application of a penalty, the process proceeds to step S48.

It should be noted that in the case where the application of a penalty continues, the penalty application is halted at that point in time.

On the other hand, in the case where manual driving can be resumed in step S72, the processes in steps S73 and S74 are skipped, and the process proceeds to step S75.

In step S75, driving maneuvers are temporarily restricted as necessary as in the process in step S48 in FIG. 8.

Thereafter, the manual driving resumption support process is terminated.

On the other hand, in the case where it is determined that manual driving cannot be resumed in step S74, that is, in the case where the driver has not corrected the driving intervention level and, therefore, is not ready to resume manual driving despite the application of a penalty, the process proceeds to step S76.

In step S76, the forceful halting process is performed as in the process in step S50 in FIG. 8.

Thereafter, the manual driving resumption support process is terminated.

Referring back to FIG. 6, on the other hand, in the case where it is determined in step S10 that the driving intervention level is not insufficient, the process proceeds to step S12.

In step S12, the automation level setting section 152 determines whether or not to change the automation level. In the case where it is determined that the automation level should be changed, the process proceeds to step S13.

For example, in the case where the distance from the current position to the next point where the automation level will be changed is shorter than a given threshold, it is determined that the automation level should be changed. Alternatively, for example, in the case where an expected value of the required time to reach the next point where the automation level should be changed from the current position is lower than a given threshold, it is determined that the automation level should be changed.

For example, in the example depicted in FIG. 7, the permissible automation level changes from level 3 to level 2 at the point P2. Therefore, in the case where the vehicle travels in automation level 3 in the zone S1, it is necessary to switch to automation level 2 before the vehicle enters the zone S2. For this reason, in the case where the distance to the point P2 is shorter than the given threshold, or in the case where an expected value of the required time to reach the point P2 is lower than the given threshold, it is determined that the automation level should be changed.

It should be noted that these thresholds are, for example, set to fall within a range that allows the driver to be sufficiently ready to resume manual driving on the basis of estimation of the amount of time required for the driver to resume manual driving in consideration of the driver's driving capability, age, condition, and so on.

Also, for example, if it becomes, in the case of automation level 3, difficult to continue with autonomous/automated driving during a preliminary response, it is determined that the automation level should be changed. For example, in the case where disengagement is notified from a preceding vehicle when the vehicle is following the preceding vehicle by using ACC, it is determined that the automation level should be changed.

In step S13, the automation level setting section 152 determines whether or not it is necessary to resume manual driving. For example, in the case where the automation level changes from level 3 or level 4 to level 2 or lower, that is, in the case where the automation level changes from a level where the driver does not intervene in driving to a level where the driver intervenes in driving, the automation level setting section 152 determines that it is necessary to resume manual driving, and the process proceeds to step S14.

In step S14, the manual driving resumption support process described above with reference to FIG. 9 is performed. Thereafter, the process proceeds to step S15.

In step S15, the driving support control section 153 determines whether or not the vehicle has been forcefully halted in the driving intervention level correction process in step S11 or the manual driving resumption support process in step S14. In the case where it is determined that the vehicle has been forcefully halted, the process proceeds to step S17.

On the other hand, in the case where it is determined that manual driving is not required to be resumed in step S13, the process proceeds to step S16.

In step S16, the notification control section 124 notifies the automation level change.

For example, the display section 29 displays, under control of the notification control section 124 and within the driver's field of view, a message indicating the automation level change.

For example, the audio output section 30 outputs, under control of the notification control section 124, a message, an alarm, a buzzer, a beeping sound, or other indicating the automation level change.

Thereafter, the process proceeds to step S17.

On the other hand, in step S12, in the case where it is determined that the automation level should not be changed, the processes from step S13 to step S16 are skipped, and the process proceeds to step S17.

In step S17, the route setting section 151 determines whether or not the destination has been reached. In the case where it is determined that the destination has yet to be reached, the process returns to step S10.

Thereafter, the processes from step S10 to step S17 are repeated until it is determined in step S15 that the vehicle has been forcefully halted or until it is determined in step 17 that the destination has been reached.

On the other hand, in the case where it is determined in step S15 that the vehicle has been forcefully halted or in the case where it is determined in step S17 that the destination has been reached, the process proceeds to step S18.

In step S18, it is determined whether or not insufficient driving intervention level has been frequent as in the process in step S41 in FIG. 8 described above. In the case where it is determined that insufficient driving intervention level has been frequent, the process proceeds to step S19.

In step S19, the penalty application section 125 applies a penalty as necessary. The penalty applied here is a post-penalty. A description will be given below of specific examples of post-penalties.

For example, the driving support control section 153 prohibits the vehicle from starting for a given time period after having forcefully halted the vehicle by controlling the traveling control section 33 under instruction from the penalty application section 125. As a result, the vehicle is delayed in arriving at the destination.

For example, the driving support control section 153 prohibits the vehicle from automated driving in automation level 3 or higher until the destination is reached or for a given time period after having forcefully halted the vehicle by controlling the traveling control section 33 under instruction from the penalty application section 125.

For example, the log generation section 126 records, in a log, information regarding a post-penalty under instruction from the penalty application section 125.

For example, information for reducing discount points for automobile insurances is recorded in a log. Discount points are reduced on the basis of the information recorded in this log at the time of signing or renewing of an automobile insurance policy.

For example, information for obligating drivers to receive a driving capability diagnosis at the time of renewal of their drivers' licenses is recorded in a log. The driver is obligated to receive a driving capability diagnosis at the time of renewal of the driver's license.

For example, information for adding driver's license violation points is recorded in a log. Violation points of the driver's license are added on the basis of information recorded in this log.

For example, information for increasing inspection items in a vehicle inspection is recorded in a log. A more detailed inspection is performed during a vehicle inspection to ensure improved safety of automated driving on the basis of information recorded in this log. At the same time, a high level of redundancy is required of equipment for realizing automated driving in order to ensure improved safety of automated driving. As a result, emphasis is placed on inspection of such redundancy.

Thereafter, the automated driving control process is terminated.

On the other hand, in the case where it is determined in step S18 that reduction of driving intervention level has not been frequent, the process in step S19 is skipped, and the automated driving control process is terminated.

As described above, the driver's dependence on automated driving is suppressed by correcting the driver's driving intervention level. In particular, the driver's mind works in such a manner as to proactively avoid suffering a disadvantage resulting from the application of a penalty. This reliably prevents, for example, the driver's level of consciousness to driving from declining due to focusing on activities or tasks other than driving or such a state from becoming a habit. As a result, for example, even in the case where a need arises to perform manual driving during autonomous/automated driving, the driver can properly and speedily respond, thus providing improved safety of automated driving.

Specific Example of Log

A description will be given here of a specific example of a log with reference to FIG. 10.

A log includes items of NUMBER (No.), DATE, TIME, MONITORING STATE, EVENT, PENALTY, and REASON FOR APPLICATION, for example.

A serial number assigned to each record of the log is recorded under "No."

Dates and times when events occurred are recorded under "Date" and "Time."

Monitoring states of the driver's condition are recorded under "Monitoring State." "Start" indicates the start of monitoring of the driver's condition, "Monitoring" indicates that the driver's condition is being monitored, and "End" indicates the end of the driver monitoring.

It should be noted that although a case was illustrated in which the driver's condition was constantly monitored in the above example, the monitoring of the driver's condition may be halted, for example, in the case where there is only a slight need to do so. For example, in the case where autonomous/automated driving is in progress as illustrated in this example, the monitoring of the driver may be halted except, for example, prior to switching to manual driving.

Contents of events that occurred are briefly recorded under "EVENT." For example, events associated with transmission and reception of various types of information such as LDM request, reception, and update are recorded. Also, driver's condition detection results, alerts to the driver, applications of penalties, or other events are recorded. Detailed driver's conditions, contents of alerts, contents of penalties applied, and so on may also be recorded. Also, transitions of the automation level are recorded.

Whether or not a penalty was applied and ranks of the applied penalties are recorded under "PENALTY." It should be noted that "NOT APPLICABLE" indicates that no penalty was applied to the corresponding event.

Reasons for application of penalties are recorded under "REASON FOR APPLICATION."

It should be noted that security measures are put in place for the log to prevent tampering, forgery, eavesdropping, and other acts.

Also, it is assumed that logs are rendered more useful in factor analysis by including images and other data in logs for increased amounts of information. On the other hand, it is highly likely that logs with no occurrences of special events are not worth storage. For this reason, for example, several to several tens of minutes worth of log may be temporarily stored in a buffer concurrently with deletion of an old log whenever necessary, and when an event arises such as a shock, an alarm, an alert, or an accident, a given time period worth of log previous to and following the event may be copied from the buffer to the storage section 35 for storage.

Further, for example, logs may be recorded to an electronic key, a remote server, or other means separately from the vehicle for easy access by other vehicles.

<Automated Driving Usage Restriction Process>

Figure 11:
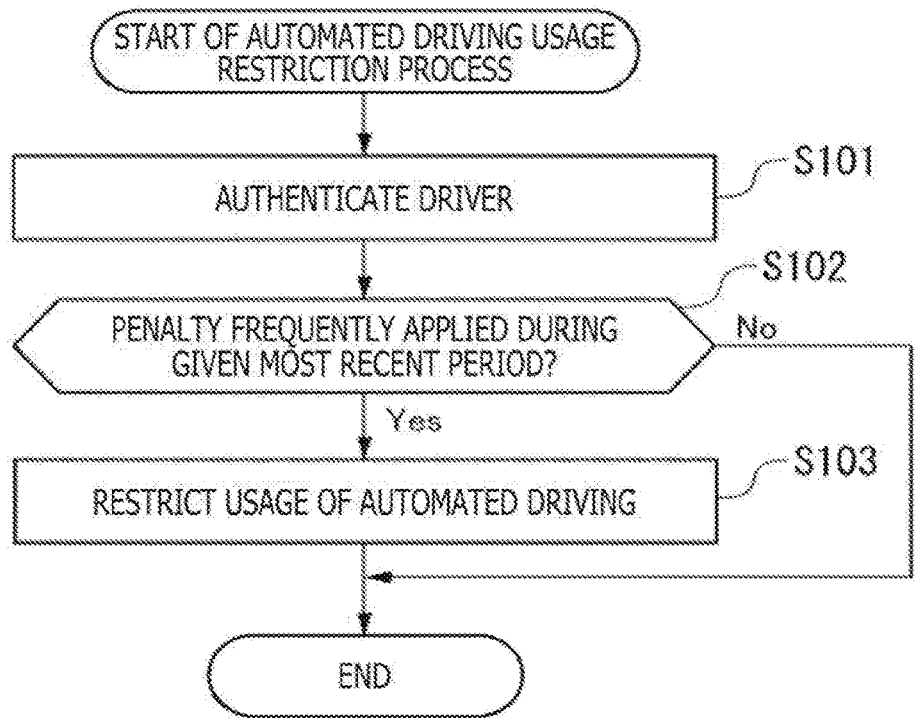
FIG. 11 is a flowchart for describing an automated driving usage restriction process.

A description will be given next of an automated driving usage restriction process performed by the vehicle control system 11 with reference to the flowchart illustrated in FIG. 11. It should be noted that this process is performed, for example, prior to the automated driving control process described above with reference to FIGS. 5 and 6.

Figure 5:
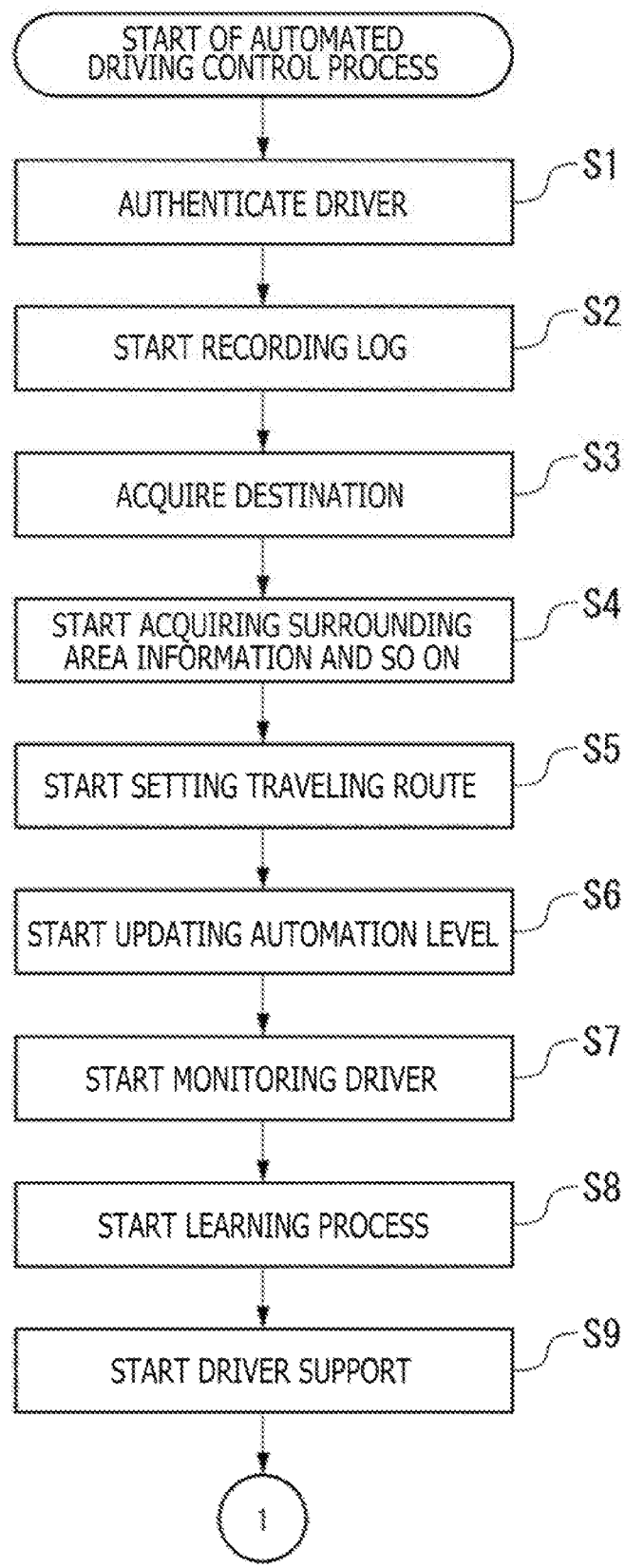
FIG. 5 is a flowchart for describing an automated driving control process.
Figure 6:
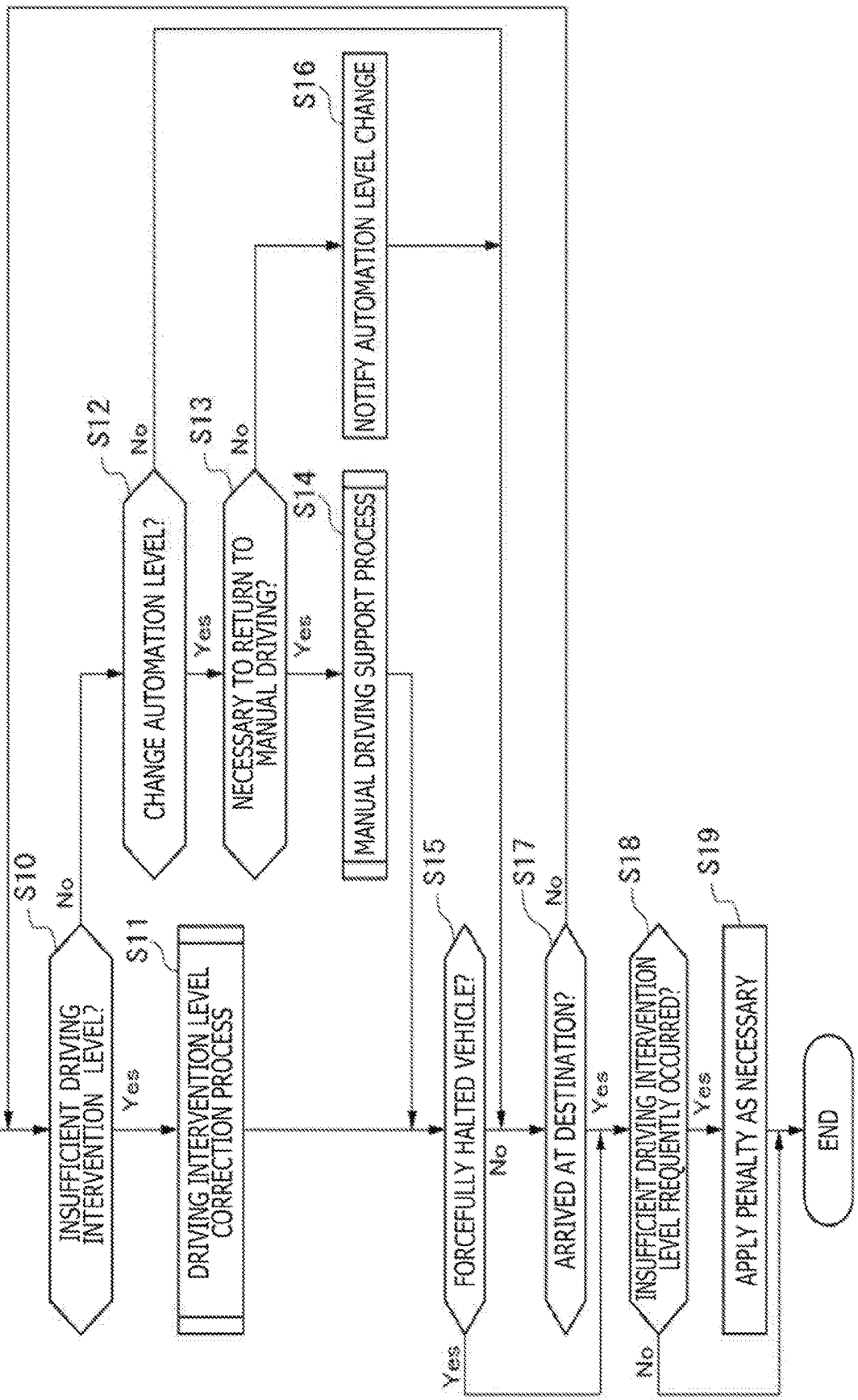
FIG. 6 is a flowchart for describing an automated driving control process.

In step S101, the driver is authenticated as in the process in step S1 in FIG. 5.

In step S102, the penalty application section 125 determines whether or not penalty applications have been frequent within a most recent given time period. Specifically, the penalty application section 125 acquires logs of the authenticated driver within the most recent given time period (e.g., one, three, or six months or one year) from the storage section 35. Next, the penalty application section 125 finds the number of penalty applications to the driver within that time period and a cumulative value of the ranks of the penalties applied. Then, in the case where the number of penalty applications is equal to or more than a given threshold, or in the case where the cumulative value of the ranks of the penalties applied is equal to or more than a given threshold, the penalty application section 125 determines that penalty applications have been frequent, and the process proceeds to step S103.

In step S103, the automation level setting section 152 restricts the use of automated driving under instruction from the penalty application section 125. For example, the automation level setting section 152 restricts available automation levels to level 2 or lower. Alternatively, the automation level setting section 152 fixes the automation level to level 0. As a result, the driver is no longer allowed to use autonomous/automated driving, thus obliging the driver to perform manual driving.

It should be noted that in the case where the driver who has used a vehicle incorporating many automated driving functions for the first time relies excessively on automated driving, the driver is highly likely to be late in resuming manual driving when it is urgently necessary to resume manual driving. For this reason, it may be rendered easier to apply the restriction of automated driving usage to such a driver even if no records indicate frequent application of penalties.

It should be noted that the driver itself desirably cannot remove the restriction of automation level usage. For example, only a vehicle dealer may be allowed to remove the restriction of automation level usage. Alternatively, the removal of the restriction of automation level usage may be permitted only when a given time period (e.g., one month) elapses.

Thereafter, the automated driving usage restriction process is terminated.

On the other hand, in step S103, in the case where the number of penalty applications is less than the given threshold and in the case where the cumulative value of the ranks of the penalties applied is less than the given threshold, the penalty application section 125 determines that penalty applications have not been frequent, and the process in step S103 is skipped, and the automated driving usage restriction process is terminated.

For example, in the case where the driver has only a short history of using an automated driving vehicle and is, therefore, not accustomed to automated driving, it is assumed that the driver will travel in an automated driving vehicle without reducing the driving intervention level and while remaining vigilant. On the other hand, as the period of use of the automated driving vehicle grows longer and as the driver becomes accustomed to automated driving, there is a concern that the driver may become less vigilant and grow more dependent on automated driving, thus resulting in a lower driving intervention level.

In response, the restriction of automated driving usage with the number of penalty applications or the cumulative value of the ranks of the penalties applied motivates the driver in such a manner as to stay clear of penalties. As a result, even if the period of use of an automated driving vehicle grows longer, it is possible to prevent the decline in driver's driving intervention level and driver's dependence on automated driving. Also, for example, a situation is prevented in which the driver, after having become accustomed to penalties applied during driving, ignores penalties and intentionally uses automated driving in a low driving intervention level. As a result, driver's excessive dependence on automated driving is prevented for any of short-term use, medium-term use, and long-term use of automated driving, thus contributing to improved safety.

Also, it is possible to build a social structure where each driver is constantly safety-conscious in all traveling levels by putting in place a penalty application structure in a complex and hierarchical manner. Then, an automobile society can be created where automated vehicles and manual vehicles are mixed in a coordinated manner.

2. Modification Example

A description will be given below of a modification example of the embodiment of the technology according to the present disclosure.

A classification of automation levels is not limited to the example described above, and the classification can be applied on the basis of some other standard.

Also, the driver's condition detection section 142 may detect one of the driver's responsiveness and awakening level, and the driving intervention level detection section 143 may detect the driving intervention level by using one of the driver's responsiveness and awakening level.

Further, for example, a plurality of penalties may be applied in combination. Also, for example, the combination of penalties applied may be changed, for example, in keeping with the driver's responsiveness and awakening level, the number and frequency of penalty applications, and so on.

Also, it is assumed that there is a need to urgently move in a vehicle in an emergency, to avoid a danger, in an under-populated area, and so on. In such a case, while-driving penalties may be removed. It should be noted, however, that, for example, the removal of while-driving penalties is recorded in a log, and that, instead, post-penalties are applied.

Further, for example, an incentive corresponding to a reward may be given to drivers who maintain a high level of responsiveness and awakening level, drivers who need to be alerted, drivers who switch safely and smoothly to manual driving, and other drivers. This incentive is expected to be effective in preventing the decline in driver's driving intervention level and driver's excessive dependence on automated driving as is a penalty.

Also, the above penalty and incentive may be operated in an as-is manner in the form of a log as points. Also, these pieces of data regarding points may be analyzed, made into a report, and recorded or output.

Further, for example, although a currently non-existent taxation system, log points may be reflected in point additions in tax credits for promoting automated driving measures and so on.

Also, for example, the vehicle control system 11 may create map data by using technology such as SLAM (Simultaneous Localization and Mapping).

The present technology is applicable to a variety of vehicles that permit automation of at least part of driving irrespective of the vehicle's source of power or source of energy supply. For example, the present technology is applicable to gasoline vehicles, hybrid vehicles, plug-in hybrid vehicles, electric vehicles, fuel cell vehicles, and so on. Also, the present technology is applicable not only to common automobiles but also to buses, trucks, motorcycles, and so on. In particular, the present technology is significantly effective in the case of application to a variety of vehicles that permit switching between autonomous/automated driving and manual driving.

3. Others

Computer Configuration Example

The series of processes described above may be performed by hardware or software. In the case where the series of processes are performed by software, the program included in the software is installed in a computer. Here, the computer includes not only a computer built into dedicated hardware but also, for example, a general-purpose personal computer capable of performing various functions when various programs are installed.

Figure 12:
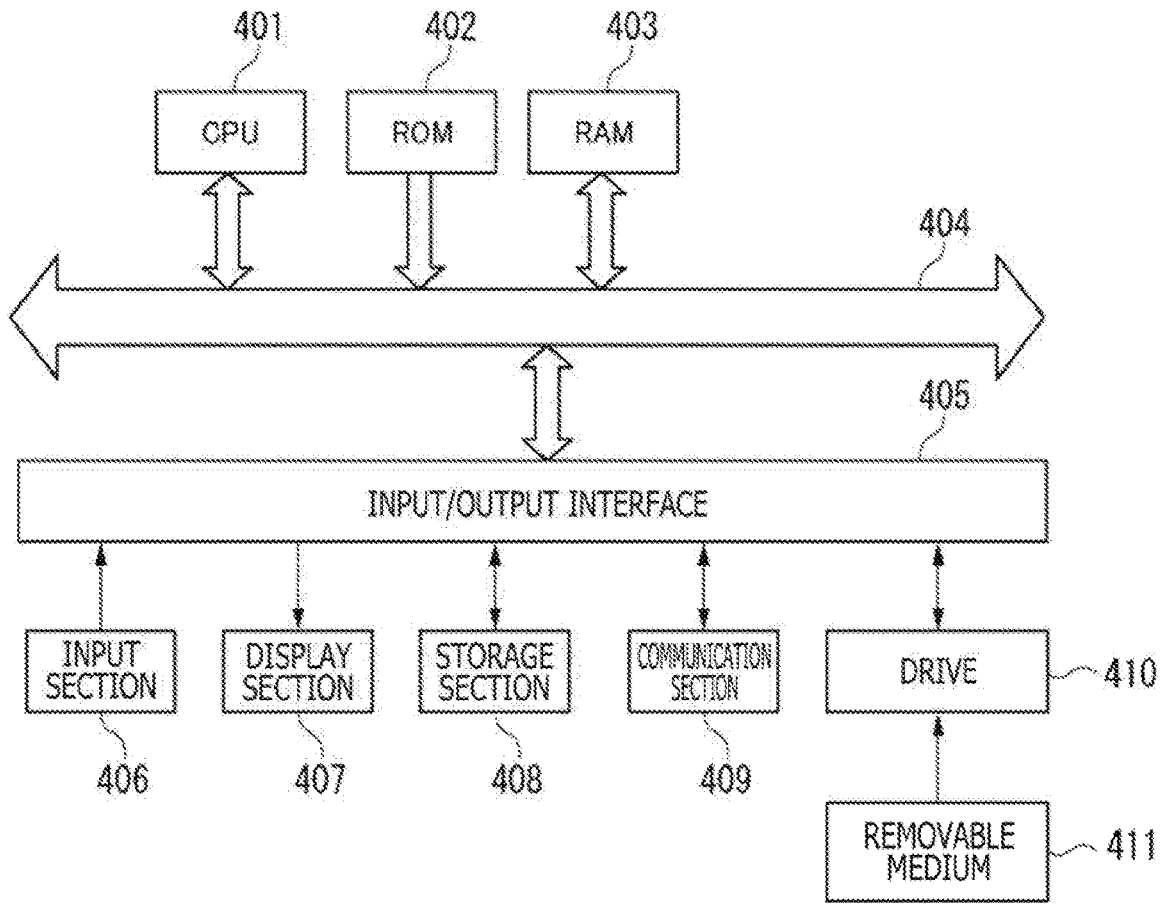
FIG. 12 is a diagram illustrating a computer configuration example.

FIG. 12 is a block diagram illustrating a hardware configuration example of a computer for performing the above series of processes by using a program.

In a computer, a CPU (Central Processing Unit) 401, a ROM (Read Only Memory) 402, and a RAM (Random Access Memory) 403 are connected to each other by a bus 404.

An input/output interface 405 is further connected to the bus 404. An input section 406, an output section 407, a recording section 408, a communication section 409, and a drive 410 are connected to the input/output interface 405.

The input section 406 includes an input switch, buttons, a microphone, an imaging element, and so on. The output section 407 includes a display, a speaker, and so on. The recording section 408 includes a hard disk, a non-volatile memory, and so on. The communication section 409 includes a network interface and so on. The drive 410 drives a removable recording medium 411 such as a magnetic disk, an optical disc, a magneto-optical disk, or a semiconductor memory.

In the computer configured as described above, the CPU 401 loads, for example, the program recorded in the recording section 408 into the RAM 403 via the input/output interface 405 and the bus 404 for execution, thereby allowing the above series of processes to be performed.

The program executed by the computer (CPU 401) can be recorded and provided, for example, in the removable recording medium 411 as a packaged medium or the like. Alternatively, the program can be provided via a wired or wireless transmission medium such as a local area network, the Internet, and digital satellite broadcasting.

In the computer, the program can be installed in the recording section 408 via the input/output interface 405 by inserting the removable recording medium 411 into the drive 410. Alternatively, the program can be received by the communication section 409 via a wired or wireless transmission medium and installed in the recording section 408. In addition to the above, the program can be installed, in advance, in the ROM 402 or the recording section 408.

It should be noted that the program executed by the computer may perform the processes chronologically in accordance with the sequence described in the present specification. Alternatively, the program may perform the processes in parallel or at a necessary timing such as when the program is invoked.

An Embodiment of the present technology is not limited to that described above and can be modified in various ways without departing from the gist of the present technology.

For example, the present technology can have the configuration of cloud computing in which a plurality of apparatuses use one function in a shared and cooperative manner via a network in order to perform processing.

Also, each of the steps described with reference to the above flowcharts may be carried out by a single apparatus or may be carried out by more than one apparatus in a shared manner.

Further, in the case where a plurality of processes are included in one step, the plurality of processes included in the one step may be performed by one apparatus or may be performed by more than one apparatus.

Examples of Combinations of Configurations

The present technology can also have the following configurations:

(1)

A vehicle control apparatus including:
 a driver monitoring section detecting a driving intervention level indicating an extent to which a driver intervenes in driving of a vehicle; and
 a penalty application section applying a penalty disadvantageous to the driver in a case where the driving intervention level is insufficient.

(2)

The vehicle control apparatus according to (1) described above, in which
 the penalty application section applies the penalty in a case where an automated driving level makes a transition from a no-driving intervention level to a driving intervention level.

(3)
The vehicle control apparatus according to (2) described above, further including:
a driving support section restricting driving maneuvers until the driver properly responds to a given instruction in a case where the insufficient driving intervention level is resolved after the penalty has been applied.

(4)
The vehicle control apparatus according to any one of (1) to (3) described above, in which
the penalty application section applies the penalty in a case where the driving intervention level remains insufficient even after a process has been performed to alert the driver before application of the penalty.

(5)
The vehicle control apparatus according to any one of (1) to (4) described above, in which
the penalty application section applies the penalty on the basis of at least one of the number of occurrences of the insufficient driving intervention level or a frequency of occurrences thereof.

(6)
The vehicle control apparatus according to any one of (1) to (5) described above, in which
the penalty application section changes the penalty to be applied in a case where the application of the penalty is repeated.

(7)
The vehicle control apparatus according to any one of (1) to (6) described above, in which
the penalty causes discomfort or reduces convenience for the driver.

(8)
The vehicle control apparatus according to (7) described above, in which
the penalty includes bringing a backrest of a driver's seat closer to a vertical direction relative to a seating surface.

(9)
The vehicle control apparatus according to (7) or (8) described above, in which
the penalty includes restricting an upper limit speed of the vehicle.

(10)
The vehicle control apparatus according to any one of (7) to (9) described above, in which
the penalty includes restricting automated driving functions of the vehicle.

(11)
The vehicle control apparatus according to any one of (7) to (10) described above, in which
the penalty includes changing a traveling route so that the vehicle will pass a route that requires the driver's intervention in driving.

(12)
The vehicle control apparatus according to any one of (1) to (11) described above, in which
the penalty application section applies the penalty after arrival of the vehicle at a destination or after a forceful halting of the vehicle.

(13)
The vehicle control apparatus according to (12) described above, in which
the penalty application section prohibits the vehicle from starting for a given time period.

(14)
The vehicle control apparatus according to (12) or (13) described above, in which
the penalty application section records, in a log, information regarding the penalty to be applied after the arrival of the vehicle at the destination or after the forceful halting of the vehicle.

(15)
The vehicle control apparatus according to any one of (1) to (14) described above, in which
the driver monitoring section determines whether or not the driving intervention level is insufficient on the basis of a condition that varies depending on the automated driving level.

(16)
The vehicle control apparatus according to any one of (1) to (15) described above, in which
the penalty application section stops the application of the penalty in the case where the insufficient driving intervention level is resolved.

(17)
The vehicle control apparatus according to any one of (1) to (16) described above, further including:
a driver's condition detection section detecting at least one of driver's responsiveness or awakening level, in which
the driver monitoring section detects the driving intervention level by using at least one of the driver's responsiveness or awakening level.

(18)
The vehicle control apparatus according to (17) described above, in which
the driver's condition detection section detects at least one of the driver's responsiveness or awakening level on the basis of the driver's response to a stimulus or an instruction given to the driver.

(19)
The vehicle control apparatus according to (18) described above, in which
the driver's condition detection section gives an instruction via an information processing apparatus used by the driver.

(20)
A vehicle control method including:
a driver monitoring step of detecting a driving intervention level indicating a level at which a driver intervenes in driving of a vehicle; and
a penalty application step of applying a penalty disadvantageous to the driver in a case where the driving intervention level is insufficient.

REFERENCE SIGNS LIST

10 Automated driving system, 11 Vehicle control system, Mobile terminal, 21 Surrounding area photography section, 22 Surrounding area information acquisition section, 23 Position measurement section, 25 Vehicle information acquisition section, Driver monitoring section, 27 Communication section, 28 Vehicle control section, 29 Display section, 30 Audio output section, 31 Light-emitting section, 32 Odor generation section, Traveling control section, 34 Vehicle-mounted apparatus control section, 101 Driver photography section, 102 Biological information acquisition section, 103 Line-of-sight detection section, 104 Authentication section, 121 Surrounding area monitoring section, 122 Driver monitoring section, 123 Automated driving control section, 124 Notification control section, 125 Penalty application section, 126 Log generation section, 127 Learning section, 141 Driving behavior analysis section, 142 Driver's condition detection section, 143 Driving intervention level detection section, 151 Route setting section, 152 Automation level setting section, 153 Driving support control section

The invention claimed is:

1. A vehicle control apparatus, comprising:
 a set of sensors configured to detect a driving intervention level wherein
  the driving intervention level is based on a plurality of automated driving levels of a vehicle and the driving intervention level indicates an extent of driver intervention in at least one driving task that controls the vehicle; and
 a processor configured to:
  determine a number of occurrences of the driving intervention level is less than a first threshold value for a specific period of time, wherein the first threshold value is different for each automated driving level of the plurality of automated driving levels;
  control an output device to output an alert signal based on the determination that the number of occurrences of the driving intervention level is less than the first threshold value;
  determine the driving intervention level remains less than a second threshold value; and
  control the output device to apply a penalty based on the determination that the driving intervention level remains less than the second threshold value, wherein the penalty is applied after the output of the alert signal.

2. The vehicle control apparatus according to claim 1, wherein the processor is further configured to apply the penalty based on the driving intervention level that remains less than the second threshold value at a transition of a specific automated driving level from a first automated driving level of the plurality of automated driving levels to a second automated driving level of the plurality of automated driving levels.

3. The vehicle control apparatus according to claim 2, wherein the processor is further configured to restrict the at least one driving task for a specific time period based on the application of the penalty.

4. The vehicle control apparatus according to claim 1, wherein the processor is further configured to apply the penalty based on a frequency of occurrences of the application of the penalty.

5. The vehicle control apparatus according to claim 1, wherein the processor is further configured to:
 determine repetition of the application of the penalty; and
 control the output device to change the penalty based on the determination of the repetition of the application of the penalty.

6. The vehicle control apparatus according to claim 1, wherein the application of the penalty corresponds to control of movement of a backrest of a driver seat of the vehicle towards a vertical direction relative to a seating surface of the vehicle.

7. The vehicle control apparatus according to claim 1, wherein the application of the penalty corresponds to restriction of a specific speed limit of the vehicle.

8. The vehicle control apparatus according to claim 1, wherein the application of the penalty corresponds to restriction of a plurality of automated driving functions of the vehicle.

9. The vehicle control apparatus according to claim 1, wherein the application of the penalty corresponds to change of a traveling route of the vehicle.

10. The vehicle control apparatus according to claim 1, wherein the penalty is applied based on one of arrival of the vehicle at a destination or a halt condition of the vehicle.

11. The vehicle control apparatus according to claim 10, wherein the processor is further configured to restrict a start operation of the vehicle for a specific time period.

12. The vehicle control apparatus according to claim 10, wherein the processor is further configured to record, in a log, information associated with the penalty based on one of the arrival of the vehicle at the destination or the halt condition of the vehicle.

13. The vehicle control apparatus according to claim 1, wherein the processor is further configured to determine that the driving intervention level remains less than the second threshold value based on a specific condition associated with the specific automated driving level of the plurality of automated driving levels.

14. The vehicle control apparatus according to claim 1, wherein the processor is further configured to:
 detect the driving intervention level based on the application of the penalty; and
 control the output device to stop the application of the penalty based on the driving intervention level that is more than the second threshold value.

15. The vehicle control apparatus according to claim 1, wherein
 the processor is further configured to detect at least one of a driver responsiveness or a driver awakening level, and
 the set of sensors is further configured to detect the driving intervention level based on at least one of the driver responsiveness or the driver awakening level.

16. The vehicle control apparatus according to claim 15, wherein the processor is further configured to detect at least one of the driver responsiveness or the driver awakening level based on one of a stimulus signal or an instruction signal.

17. The vehicle control apparatus according to claim 16, wherein the processor is further configured to output the instruction signal to an information processing apparatus.

18. A vehicle control method, comprising:
 in a vehicle control apparatus:
  detecting, by a set of sensors, a driving intervention level wherein
   the driving intervention level is based on a plurality of automated driving levels and the driving intervention level indicates an extent of driver intervention in at least one driving task that controls the vehicle;
  determining, by a processor, a number of occurrences of the driving intervention level is less than a first threshold value for a specific period of time, wherein the first threshold value is different for each automated driving level of the plurality of automated driving levels;
  outputting, by an output device, an alert signal based on the determination that the number of occurrences of the driving intervention level is less than the first threshold value;
  determining the driving intervention level remains less than a second threshold value; and
  applying, by the output device, a penalty based on the determination that the driving intervention level remains less than the second threshold value, wherein the penalty is applied after the output of the alert signal.

\* \* \* \* \*